United States Patent [19]

Takamatsu et al.

[11] Patent Number: 4,567,358

[45] Date of Patent: Jan. 28, 1986

[54] AUTOMATIC TELLER SYSTEM

[75] Inventors: Satoru Takamatsu; Takashi Sugimura, both of Yokohama, Japan

[73] Assignee: Tokyo Shibaura Denki Kabushiki Kaisha, Kawasaki, Japan

[21] Appl. No.: 542,606

[22] Filed: Oct. 17, 1983

[30] Foreign Application Priority Data

Oct. 18, 1982 [JP] Japan ............................ 57-182541

[51] Int. Cl.⁴ ............................................ G06F 15/30

[52] U.S. Cl. ............................................ 235/379

[58] Field of Search ................................. 235/379

[56] References Cited

U.S. PATENT DOCUMENTS 4,438,326 3/1984 Uchida ............................ 235/379

*Primary Examiner*—Harold I. Pitts

*Attorney, Agent, or Firm*—Cushman, Darby & Cushman

[57] ABSTRACT

In an automatic teller system, an automatic teller machine reads representative account number data recorded on a transaction medium and transmits the representative account number data to an electronic data processing center. The center reads out from a memory data which indicates at least one account number and which corresponds to the transmitted representative account number data. The read data is supplied to the automatic teller machine and is selectively displayed at the automatic teller machine.

6 Claims, 43 Drawing Figures

(REQUEST FOR PB, CHEQUEBOOK, STATEMENT)

(TIME OUT)

(FIG. 15-1)

AUTOMATIC TELLER SYSTEM

BACKGROUND OF THE INVENTION

The present invention relates to an automatic teller system having a plurality of automatic teller machines used in banking facilities such as banks and post offices so as to automatically perform deposit and payment (withdrawal) transactions, and a data processing center for storing transaction data of these automatic teller machines.

In general, a conventional automatic teller machine used in the system described above can perform transactions for each one of different types of account numbers (e.g., savings account number, checking account number and credit card account number) of accounts held by an individual customer. The customer must use a plurality of cards respectively corresponding to the types of account. The account number control management becomes complex and time-consuming.

SUMMARY OF THE INVENTION

It is an object of the present invention to provide an automatic teller system wherein transactions using a plurality of account numbers of an individual customer can be performed by a single transaction medium, thereby simplifying transaction procedures.

In order to achieve the above object of the present invention, there is provided an automatic teller system comprising: an automatic teller machine for automatically performing transactions such as a deposit and a payment through a recording medium; an electronic data processing center connected to said automatic teller machine and having a memory for storing transaction item data corresponding to various types of account numbers, said electronic data processing center being arranged to respond to a transaction processing request from said automatic teller machine; first transmitting means for transmitting to said electronic data processing center account number data which is recorded on the recording medium and which is read by said automatic teller machine or account number data which is specified by a customer; second transmitting means for reading out from said memory transaction item data corresponding to the account number data transmitted from said first transmitting means and for transmitting the read transmission item data to said automatic teller machine, and displaying means for selectively displaying at said automatic teller machine the read transmission item data transmitted from said second transmitting means.

BRIEF DESCRIPTION OF THE DRAWINGS

Other objects and features of the present invention will be apparent from the following description taken in connection with the accompanying drawings, in which:

FIGS. 15-1 to 15-27 are flow charts for explaining the operation of the machine shown in FIG. 1; and FIGS. 16 and 17 are representations showing display examples at a CRT display section.

DETAILED DESCRIPTION OF THE PREFERRED EMBODIMENT

An automatic teller machine according to an embodiment of the present invention will be described with reference to the accompanying drawings.

Figure 1:
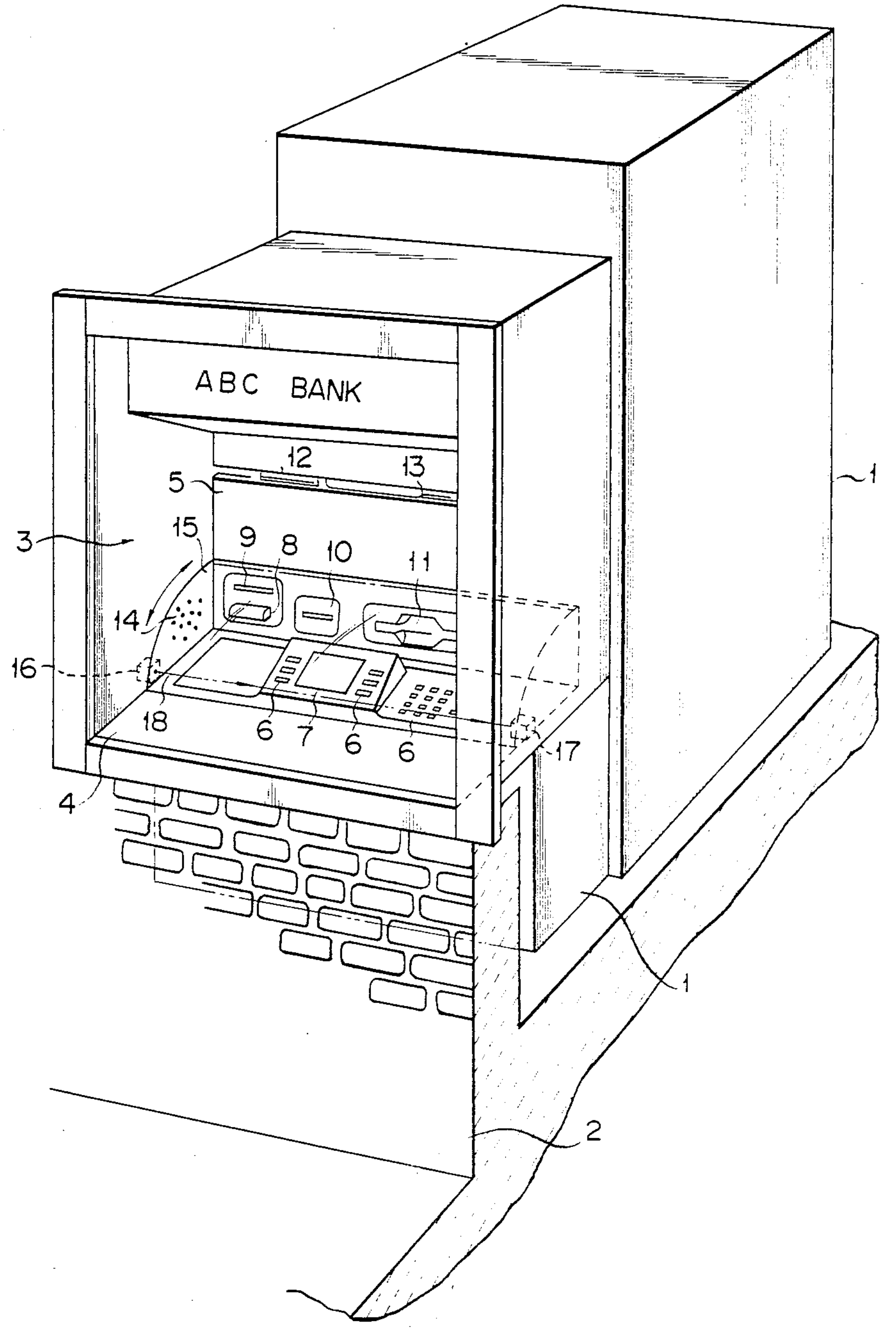
FIG. 1 is a perspective view showing the outer appearance of an automatic teller machine according to an embodiment of the present invention.

FIG. 1 shows an automatic cash insertion/dispensing unit as an outer wall type automatic teller machine. An operation section 3 of a housing 1 is disposed to open through an outdoor wall 2. The operation section 3 is disposed substantially at the center of the housing 1 with respect to the height of the housing 1. The operation section 3 has a horizontal operation panel 4 and a vertical operation panel 5 formed integrally with the rear edge of the horizontal operation panel 4.

A keyboard 6 of numerical keys and a CRT display 7 are arranged in the horizontal operation panel 4. An envelope dispensing port 8, an envelope insertion port 9, a receipt dispensing port 10, and a bill dispensing port 11 are formed in the lower portion of the vertical operation panel 5. A bankbook or passbook insertion port 12 and a card insertion port 13 are formed in the upper portion of the vertical operation panel 5.

Apertures 14 are formed at an inner side wall of the operation section 3. A speaker (not shown) is mounted inside the wall in which the apertures 14 are formed.

An arcuated shutter 15 is disposed to close/open the operation section 3 so as to expose/cancel the keyboard 6, the CRT display 7, the envelope dispensing section 8, the envelope insertion port 9, the receipt dispensing port 10, the bill dispensing port 11, and the apertures 14. The shutter 15 is disposed to protect the operation section 3 from burglars, rain and dust. The shutter 15 comprises a transparent reinforced plastic member which forms part of a cylinder having a predetermined radius of curvature. A light-emitting element 16 and a photosensor 17 are arranged inside the two side walls of the operation section 3. A foreign matter detector 18 comprising the photosensor 17 and the light-emitting element 16 detects foreign matter such as a paper sheet or a hand inside the shutter 15.

Figure 2:
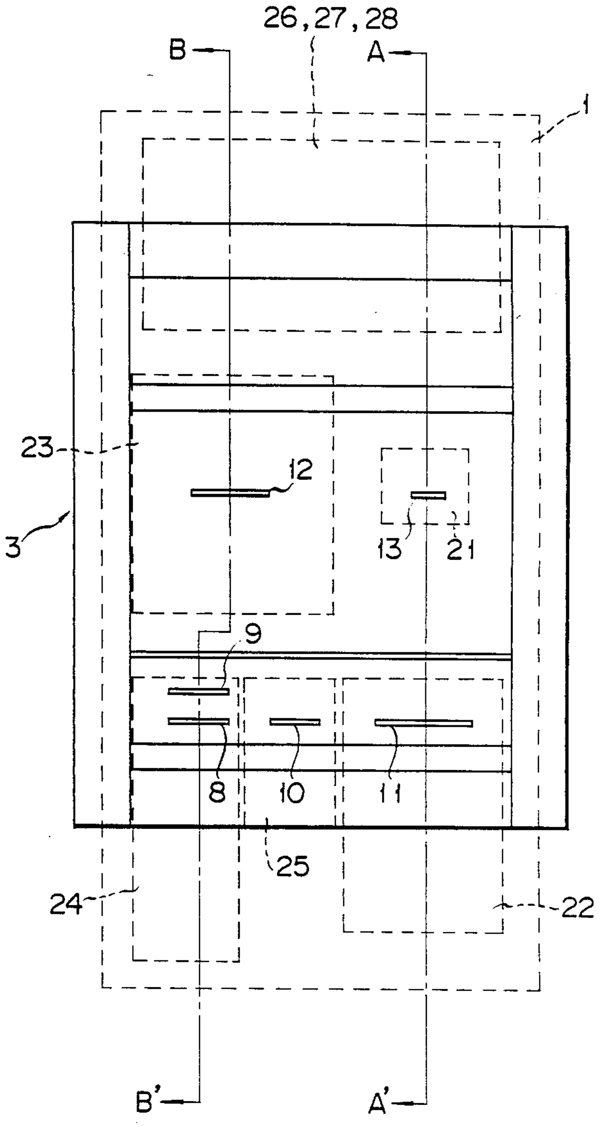
FIG. 2 is a representation showing the internal construction of the automatic teller machine shown in FIG. 1.
Figure 3:
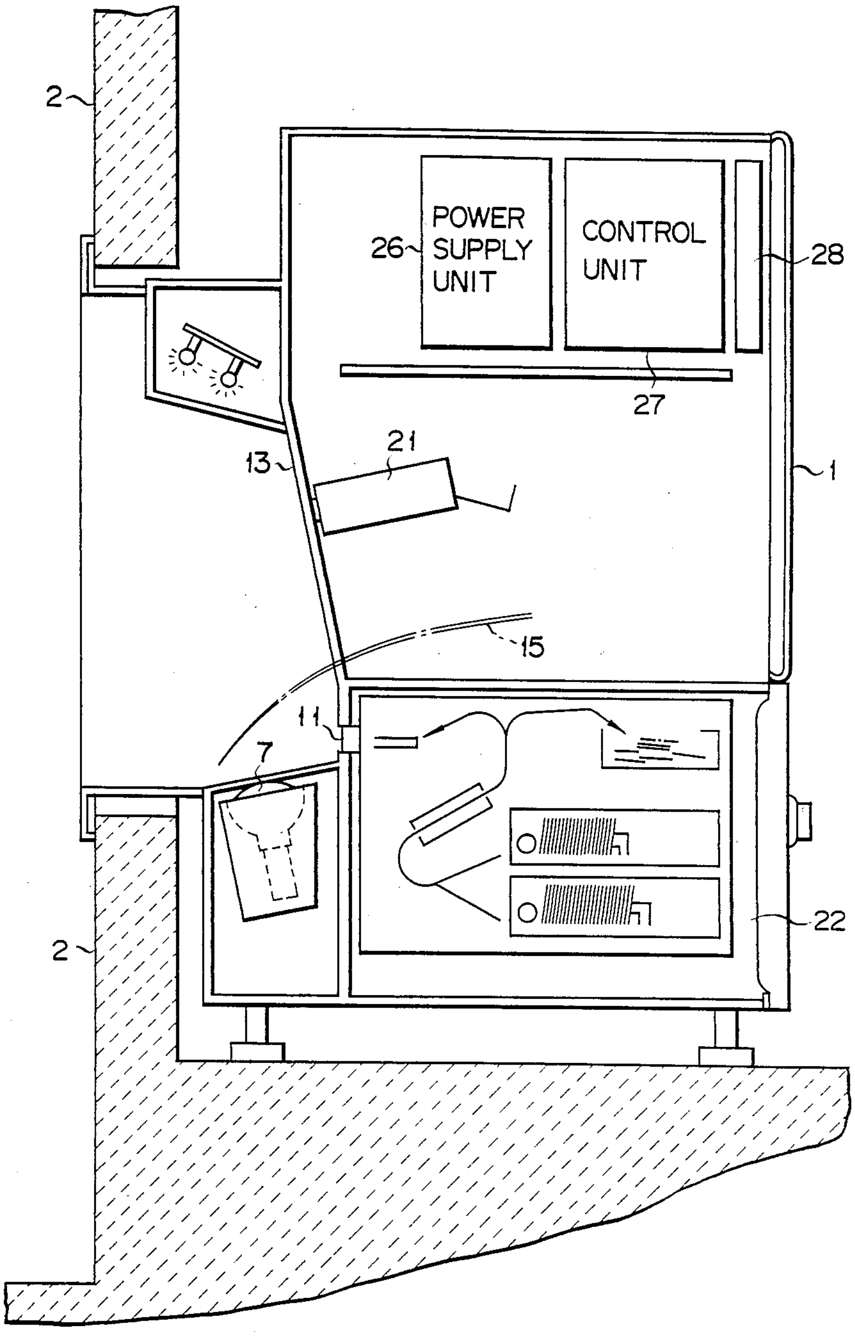
FIG. 3 is a sectional view of the automatic teller machine shown in FIG. 2, taken along the line A—A' thereof.
Figure 4:
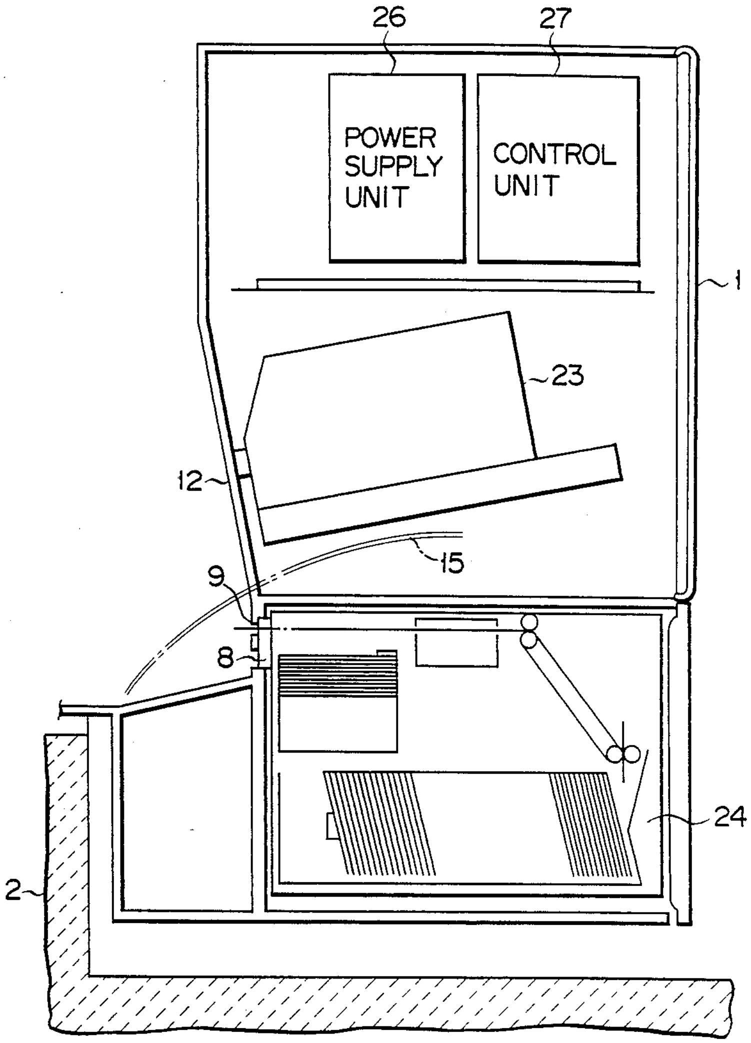
FIG. 4 is a sectional view of the automatic teller machine shown in FIG. 2, taken along the line B—B' thereof.

As shown in FIGS. 2 through 4, the housing 1 has: a card reader 21 for reading ID card information from an ID card inserted through the card insertion port 13; a bill dispensing mechanism 22 for dispensing bills P corresponding to a predetermined amount at the bill dispensing port 11; a passbook or bankbook reader/printer 23 for reading information from the magnetic strip of a passbook inserted at the passbook insertion port 12 and for printing details of a transaction on a journal; an envelope or bag processing unit 24 for receiving an envelope which is inserted at the envelope insertion port 9 and which is printed with predetermined characters, and for dispensing such an envelope at the envelope dispensing port 8; a receipt issuing unit 25 for issuing a receipt which carries printed transaction details and for dispensing it at the receipt dispensing port 10; a power supply unit 26; a control unit 27; a control panel 28; and a shutter receiving mechanism (not shown) for receiving the shutter 15.

The wall thickness of the housing portion around the bill dispensing mechanism 22 is made thick and rigid by using a stainless steel plate or cold rolled steel plate which has a thickness of about 10 to 30 mm. Cold rolled steel having a thickness of 1 to 2 mm is used as the material for the rest of the housing portion, thereby obtaining a burglarproof housing.

Figure 5:
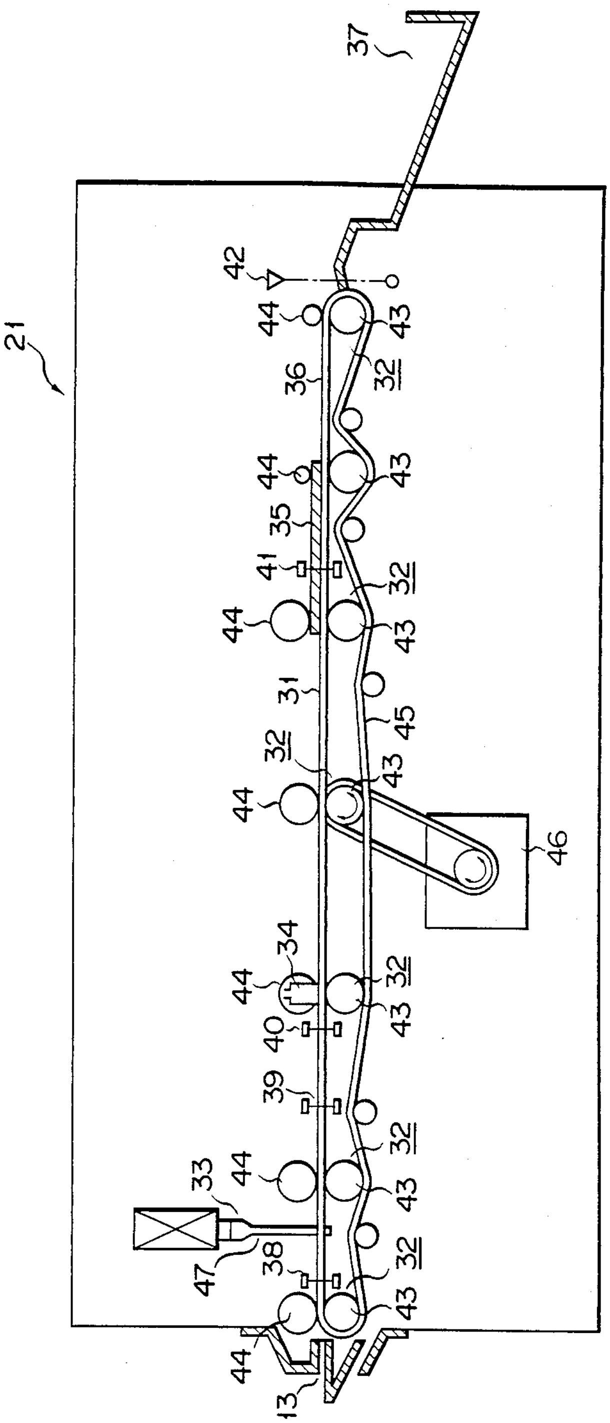
FIG. 5 is a sectional view of a card reader of the machine shown in FIG. 1.

FIG. 5 shows the card reader 21. A convey path 31 of a card inserted at the card insertion port 13 comprises a plurality of paired conveyor rollers 32. A shutter mechanism 33, a magnetic head 34, a card retention portion 35 and an embossing portion 36 are disposed along the conveyance path 31 from the card insertion port 13. The distal end of the convey path 31 opposes a container 37. Each of card detectors 38, 39, 40, 41 and 42 comprises a known circuit of a light-emitting element and a photosensor. The card detector 38 detects the presence of a card at the card insertion port 13; the card detector 41 detects the presence of a card at the card retention portion 35; and the detector 42 detects the passage of a card into the container 37. Each pair of the plurality of paired conveyor rollers 32 comprises a driver roller 43 and a pinch roller 44. A conveyor belt 45 is looped around the driver rollers 43. The pinch rollers 44 are respectively brought into contact with the driver rollers 43 through the conveyor belt 45. The driver rollers 43 are driven by a reversible pulse motor 46. The pinch roller 44 disposed nearest the card insertion port 13 has a strong urging force when the conveying operation is performed and has a weak urging force when the conveying operation is not performed.

The shutter mechanism 33 is disposed to open/close the conveyance path 31 between the pair of conveyor rollers 32 nearest the card insertion port 13 and the next pair of conveyor rollers 32. The shutter mechanism 33 is interlocked with the pinch roller 44 nearest the card insertion port 13 such that the urging force of the pinch roller 44 is strong in the opened state of a shutter 47 and is weak in the closed state thereof.

The magnetic head 34 is coaxially disposed with the pinch rollers 44 of the paired conveyor rollers 32. While the magnetic head 34 reads information from a card, the card is held by the pinch rollers 44 so as not to change its conveying condition. The card retention portion 35 is formed on the conveyance path 31 so as to temporarily stop a card which has been conveyed. The embossing portion 36 serves to copy the account number recorded on a card in a three-dimensional manner onto a receipt or the like. The container 37 serves to store a recovered card and keep it therein.

When a card is inserted at the card insertion port 13 and is detected by the card detector 38, the pulse motor 46 is started and the shutter 47 is opened. The card is then conveyed along the conveyance path 31. The information on the card is then read by the magnetic head 34 while the card is being conveyed. The card is temporarily stopped at the embossing portion 36 and is subjected to an embossing operation. Thereafter, the pulse motor 46 is rotated in the reverse direction and the card is returned to the card insertion port 13, or is eventually captured and recovered into the container 37. After the card has been continuously detected by the card detector 38 for a predetermined period of time, the pulse motor 46 is stopped, and the shutter 47 is closed. The card is held at the card insertion port 13 such that part of the card is exposed outside the card insertion port 13. When the user removes the card from the card insertion port 13 and the card detector 38 detects this removal, this indicates that the transaction is completed. The next transaction can then be performed from the initial step. On the other hand, when the card continues to be detected by the card detector 38 after the predetermined period of time, the pulse motor 46 is started to convey the card, the information on which is again read by the magnetic head 34, and the shutter 47 is opened. After the card has been detected by the card detector 41 for a predetermined period of time, the pulse motor 46 is stopped. In this situation, the card is kept at the card retention portion 35.

When the customer realizes that he should remove his card, he enters card return request data (i.e., depresses keys at the keyboard 6 to enter his ID number). Assuming that the input data coincides with the transaction details made by the card having the ID number corresponding to the input data, the pulse motor 46 is started to return the card retained in the retention portion 35, so as to dispense the card. Thereafter, the above-mentioned operating steps are repeated. Therefore, the card which is accidentally not removed by the customer can be properly and automatically returned to the customer. However, if the input data indicates an ID number which does not coincide with that recorded on the card, the above check is repeated three times. If a coincidence is not established after the above operation is repeated three times, a new transaction cannot be performed.

When the next customer depresses a selection button for a transaction, and before his ID number is entered, the retained card of the previous customer passes through the embossing portion 36 and the card detector 42 and is recovered into the container 37. In this case, for example, if the second customer wishes to withdraw cash, the card of this customer is inserted within a short period of time immediately after he depresses the selection button. The card insertion operation and the card recovery operation are performed along the same convey path 31, so that the card of the previous customer can be recovered at the same time as the card of the next customer can be inserted by driving the pulse motor 46 in a predetermined direction. When the card of the previous customer has been recovered, the transaction step for the second customer is executed.

Figure 6:
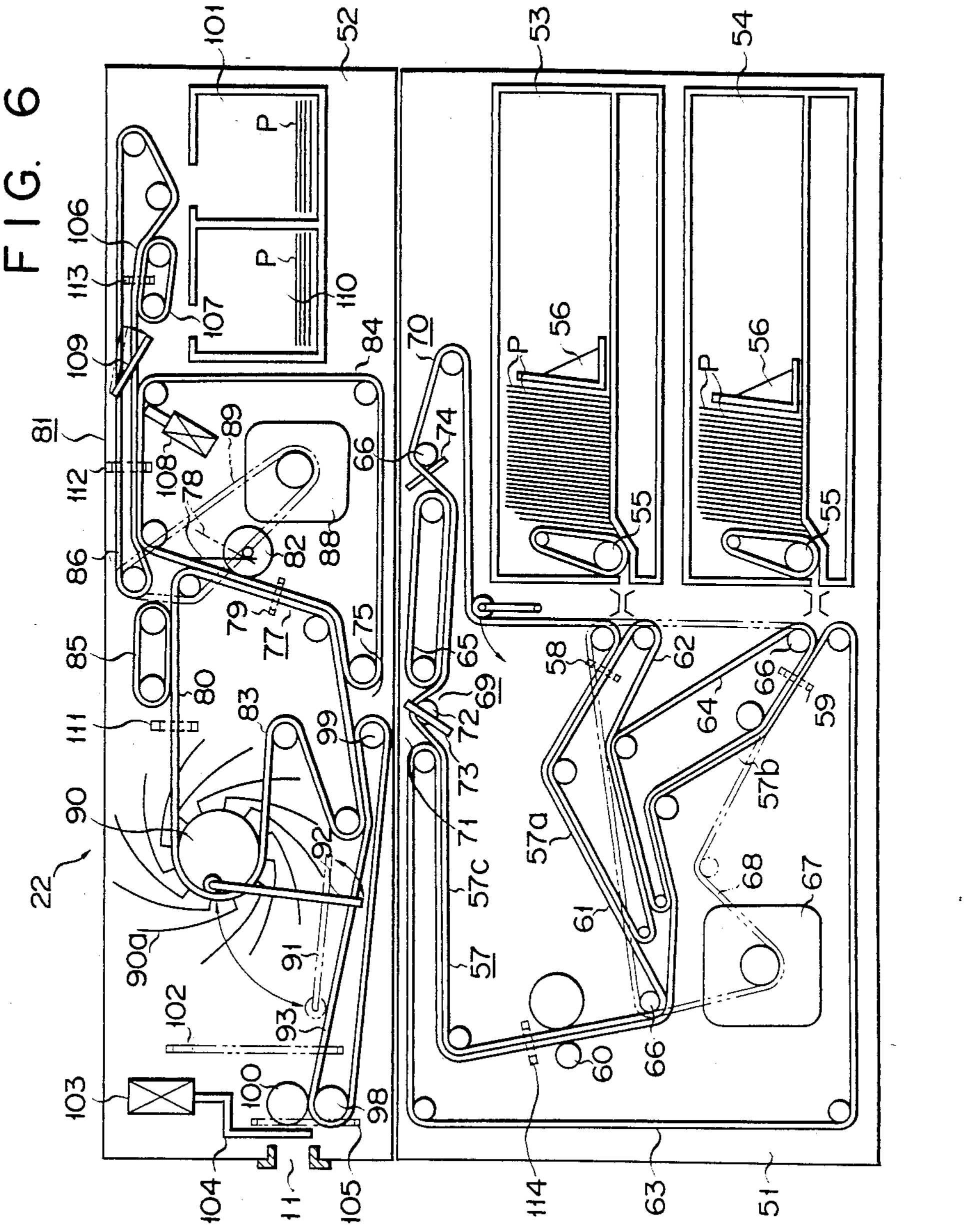
FIG. 6 is a sectional view of a cash dispensing mechanism of the machine shown in FIG. 1.

As shown in FIG. 6, the bill dispensing mechanism 22 is divided into a first unit 51 and a second unit 52. The first unit having first and second safes 53 and 54 can be rotated by 180° with respect to the second unit 52.

The first and second units 51 and 52 will be described with reference to FIG. 6. The first and second safes 53 and 54 are disposed in the front portion (right-hand side in FIG. 6) of the first unit 51 such that the first safe 53 is placed above the second safe 54. For example, $100 bills P are stored in the first safe 53 and $10 bills P are stored in the second safe 54. Backup mechanisms 56 are respectively disposed in the first and second safes 53 and 54 so as to properly urge the bills toward dispensing mechanisms 55, respectively. A $100 bill P or $10 bill P is selectively dispensed.

A conveyance path 57 is formed at the rear portion (left-hand side in FIG. 6) of the first unit 51 so as to convey the bill P selectively dispensed from one of the first and second safes 53 and 54. The conveyance path 57 comprises a first conveyance path 57*a* for conveying a $100 bill P dispensed from the first safe 53, a second conveyance path 57*b* for conveying a $10 bill P dispensed from the second safe 54, and a common conveyance path 57*c* for conveying the $100 bill P and the $10 bill P respectively conveyed along the first and second conveyance paths 57*a* and 57*b*, respectively.

A bill detector 58 is arranged in the conveyance path 57*a* to detect the $100 bill P; a bill detector 59 is arranged in the conveyance path 57*b* to detect the $10 bill P; and bill detectors 60 and 114 are arranged in the common conveyance path 57*c* in the order named to detect overlaying, folding and tearing of the bill.

The first conveyance path 57*a* is formed at an opposing portion between each of a pair of first conveyor belts 61 (only one belt is illustrated) and each of a pair of second conveyor belts 62 (only one belt is illustrated). The second conveyance path 57*b* is formed at an opposing portion between each of a pair of third conveyor belts 63 (only one belt is illustrated) and each of a pair of fourth conveyor belts 64 (only one belt is illustrated). The common conveyance path 57*c* is formed at opposing portions between the pairs of first and third conveyor belts 61 and 63 and between the pair of first conveyor belts 61 and a pair of fifth conveyor belts 65 (only one belt is illustrated).

The driving force of a motor 67 is transmitted through a power transmission system 68 to some of rollers 66 around which the conveyor belts 61 to 65 are looped.

The common conveyance path 57*c* is disposed to convey the bill P upward along the front end face of the first unit 51 and horizontally convey it in the backward direction. First and second bill transfer portions 69 and 70 are formed at a horizontal portion of the common conveyance path 57*c* so as to selectively transfer bills to the second unit 52. The first bill transfer portion 69 is formed such that a portion of each of the first conveyor belts 61 is inserted through a press roller 72 in a space formed between an arcuated portion of each of the third conveyor belts 63 and one arcuated portion of each of the fifth conveyor belts 65. A first guide plate 73 is disposed in the first bill transfer portion 69. The second bill transfer portion 70 is formed such that the intermediate portion of each of the first conveyor belts 61 is supported by a roller 66 so as to travel toward the other arcuated portion of each of the fifth conveyor belts 65. A second guide plate 74 is disposed in the second bill transfer portion 70.

The second unit 52 has a structure as follows. A convey path 77 is formed at the center (upper center in FIG. 6) of the length of the second unit 52 so as to receive the bill P from a bill reception port 75 and convey it upward. A first sorting gate 78 is disposed at the terminal end of the conveyance path 77. When the leading end of the bill P reaches a bill detector 79 arranged in the intermediate portion of the conveyance path 77, the bill P is selectively conveyed by a gate actuator 82 such as a rotary solenoid to a proper bill convey path 80 or an improper bill conveyance path 81.

The conveyance path 77 is formed at an opposing portion between a pair of sixth conveyor belts 83 and a pair of seventh conveyor belts 84. The proper bill conveyance path 80 is formed at an opposing portion between the top surface of the horizontal portion of one of the sixth conveyor belts 83 and a surface portion of one of the pair of eighth conveyor belts 85 which overlies this horizontal portion. The improper bill conveyance path 81 is formed at an opposing portion between the top surface of the horizontal portion of one of the seventh conveyor belts 84 and a surface portion of one of the pair of ninth conveyor belts 86 which overlies this horizontal portion.

The conveyor belts 83 to 86 travel in predetermined directions when a driving force of a motor 88 is transmitted through a power transmission system 89 to some of rollers 87 around which the conveyor belts 83 to 86 are looped.

Impellers 90 are disposed at the terminal end of the proper bill conveyance path 80. The proper bill P is held between two adjacent blades 90*a* of each of the impellers 90. Upon rotation of the impellers 90, the proper bill P is carried to a temporary stacking section 91. The bill P is then separated from the impellers 90 respectively by separation stoppers 92. The bill P is then stacked on bill dispensing/recovery conveyor belts 93 which form the lower side of the temporary stacking section 91.

The conveyor belts 93 are looped between a roller 98 disposed in the vicinity of the bill dispensing port 11 and a roller 99 disposed in the vicinity of the bill reception port 75. A pinch roller 100 is brought into tight contact with the upper portion of the roller 98 through the conveyor belts 93 in the vicinity of the bill dispensing port 11. A portion of each of the sixth conveyor belts 83 overlaps the upper portion of a corresponding one of the conveyor belts 93.

The bills P stacked in the temporary stacking section 91 are conveyed to the bill dispensing port 11 or to a recovery container 101 in accordance with the separation stoppers 92 serving as urging members and the conveying direction of the conveyor belts 93.

A bill detector 102 is arranged between the pinch roller 100 and the temporary stacking section 91 to detect the trailing ends of stacked bills P to be dispensed at the bill dispensing port 11. The bill detector 102 serves to stop travel of the conveyor belts 93. A shutter 104 is disposed between the bill dispensing port 11 and the pinch roller 100 and can be opened/closed by a solenoid 103. A bill detector 105 is arranged behind the shutter 104 when viewed in the direction of conveyance away from the bill dispensing port 11.

When the customer forgets to remove bills P dispensed at the bill dispensing port 11, or when two improper bills P are erroneously stacked in the temporary stacking section 91, these bills P are delivered through a bill recovery conveyance path 106 and are recovered into the recovery container 101 disposed at the rear portion of the second unit 52. The conveyance path 106 is formed by the upper portion of each of the conveyor belts 93, the conveyance path 77, the conveyance path 81 and the rear lower surface of each of the ninth belts 86 overlying a pair of 10th conveyor belts 107. The terminal end of the conveyance path 106 opposes the recovery container 101.

A second sorting gate 109 is disposed in the vicinity of the terminal end of the improper bill convey path 81 constituting an intermediate portion of the conveyance path 106. The second sorting gate 109 is operated by a solenoid 108. By means of the second sorting gate 109, improper bills P are delivered to a rejected bill container 110 disposed in front of the recovery container 101, and the recovered bills P are directly delivered to the recovery container 101.

A bill detector 111 is arranged in the intermediate portion of the conveyance path 80; an improper bill detector 112 is arranged in the intermediate portion of the conveyance path 81 to detect an improper bill P; and a bill detector 113 is arranged in the intermediate portion of the bill recovery conveyance path 106 to detect a bill passing therealong.

It should be noted that each of the bill detectors 58, 59, 79, 102, 105, 111, 112, 113 and 114 comprises a known photocoupler of a light-emitting element and a photosensor.

Figure 7:
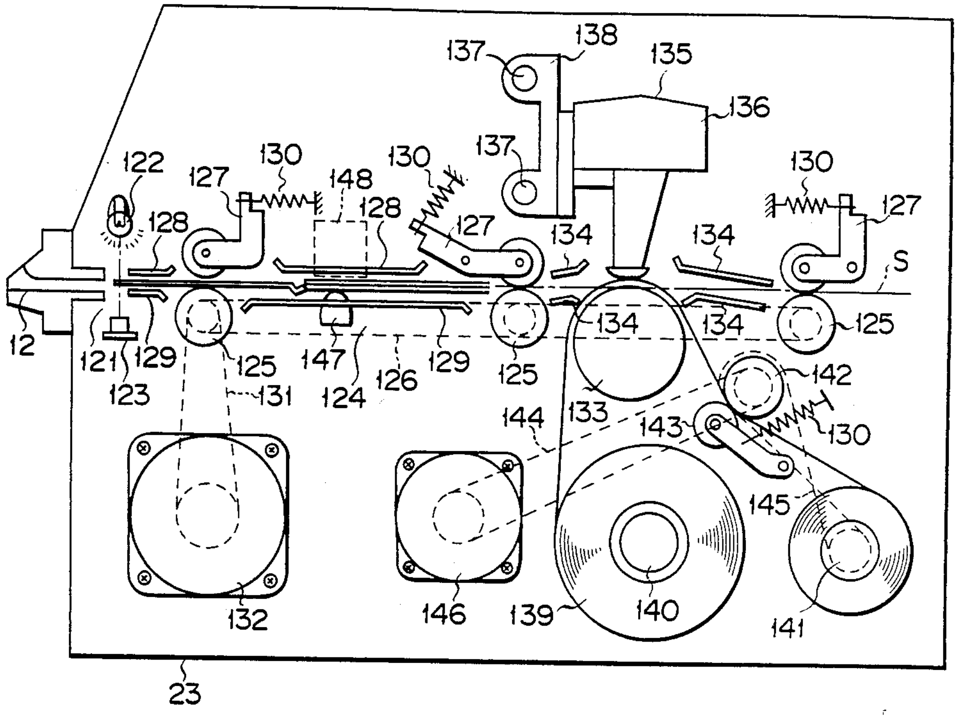
FIG. 7 is a sectional view of a passbook (bankbook) reader/printer of the machine shown in FIG. 1.

FIG. 7 shows the passbook reader/printer 23. A pair of photodetectors 121 are arranged inside the passbook reader 23 in the vicinity of the passbook insertion port 12. Each of the detectors comprises a light source 122 and a photosensor 123. A conveyance path 124 is disposed from the pair of detectors 121 toward the inside of the passbook reader/printer 23. The conveyance path 124 comprises a belt 126 looped around rollers 125, pinch rollers 127, and upper and lower guide plates 128 and 129. A reading portion 148 is arranged along the guide plate 128 to optically read the last printed line and a page mark indicating a page of the passbook. A magnetic head 147 is mounted on the lower guide plate 129 to read data from the magnetic strip of the passbook. The pinch rollers 127 are urged by respective springs 130 toward the respective rollers 125. The rollers 125 are driven by a pulse motor 132 through a belt 131. A platen 133 extends upward to a level higher than that of a conveyance reference surface S of the conveyance path 124. Two pairs of press guide members 134 are disposed at the front and rear portions, respectively, of the platen 133 to clamp the passbook therebetween, and are inclined so as to move it upward toward the upper surface of the platen 133. A printer 135 is disposed to oppose the platen 133 through the conveyance path 124. The printer 135 comprises a printing head 136 and a carriage 138 for supporting the printing head 136 so as to move it along a sliding rod 137 in a direction parallel to the axis of the platen 133. The carriage 138 is driven by a pulse motor (not shown). A journal paper roll 139 is fed around the platen 133. The journal paper roll 139 is mounted on a supply reel 140 and is taken up by a takeup reel 141. The journal paper roll 139 is clamped between a supply roller 142 and a pinch roller 143 opposed thereto and is fed to the side of the takeup reel 141. The pinch roller 143 is urged by a corresponding spring 130 toward the supply roller 142. The supply roller 142 and the takeup reel 141 are driven by a pulse motor 146 through belts 144 and 145, respectively. The takeup reel 141 is rotated at a faster speed than is the supply roller 142. When a heavy load is imposed on the takeup reel, the belt 145 slips off therefrom.

Figure 8:
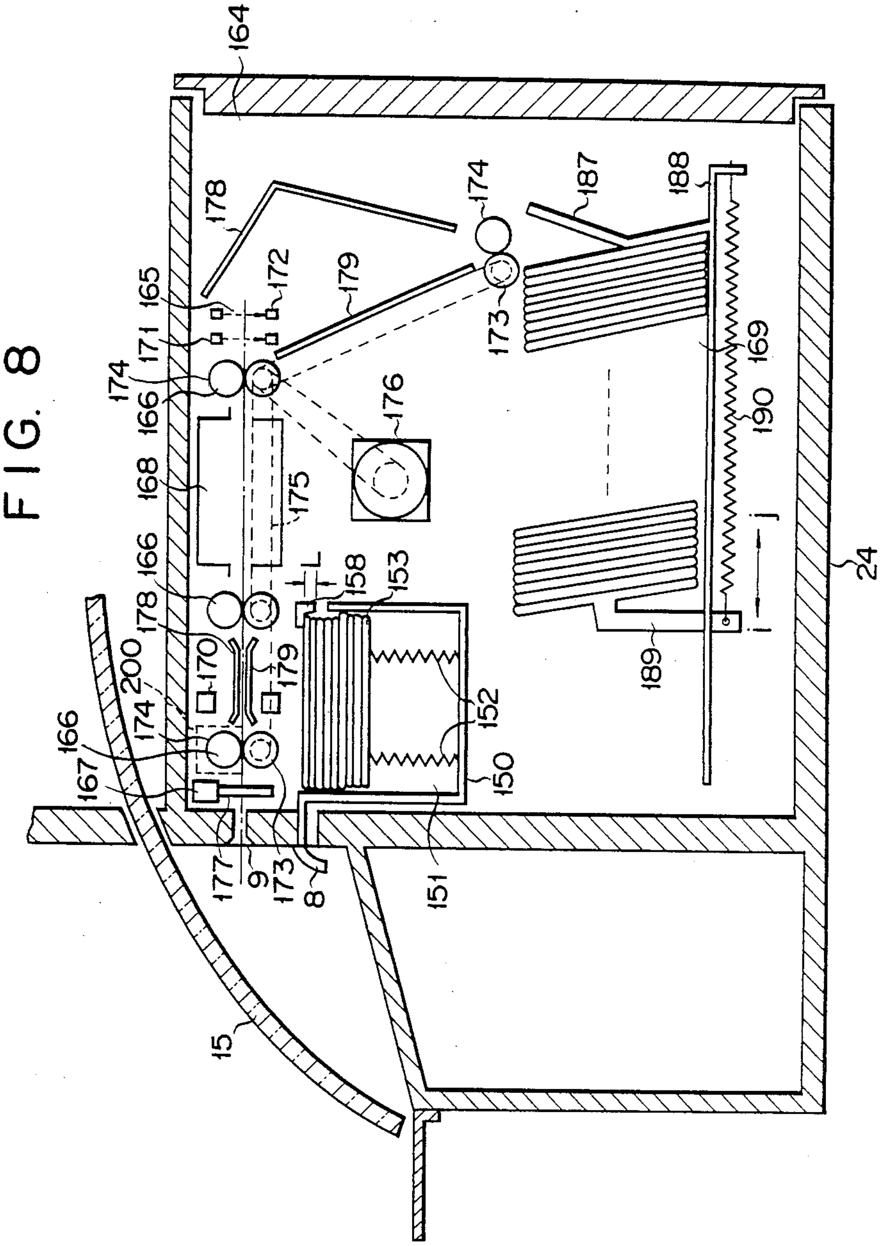
FIG. 8 is a sectional view of an envelope issuing unit of the machine shown in FIG. 1.
Figure 9:
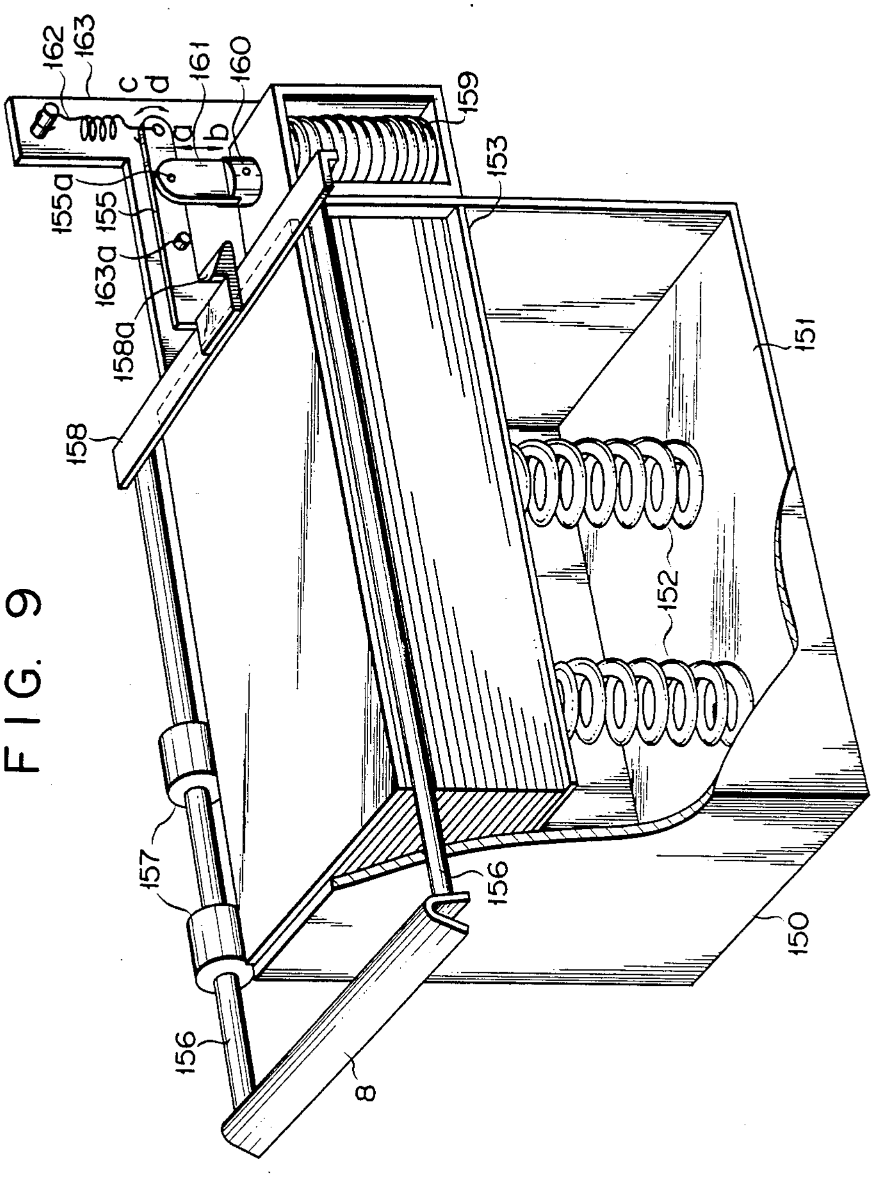
FIG. 9 is a partially cutaway perspective view of the envelope issuing unit shown in FIG. 8.

FIG. 8 shows the envelope processing unit 24. An envelope issuing unit 150 is disposed just inside the unit (e.g., the handle 8). The envelope issuing unit 150 dispenses individual envelopes to be used for holding bills which are to be deposited. The envelope cannot be obtained without selection of the deposit transaction. The envelope issuing unit 150 has a press plate 153, which is pressed by springs 152, in a hopper 151, as shown in FIG. 9. New envelopes are stacked on the press plate 153. One end of each of shafts 156 is slidably mounted on each end of the handle 8 through each of opening portions (not shown) formed at the operation section 3. The shafts 156 are slidably supported by supports 157 disposed at the upper portion of the hopper 151, respectively. An envelope dispensing plate 158 is disposed to extend across the other end of each of shafts 156. The envelope dispensing plate 158 has an L-shaped structure. A width L of the envelope dispensing plate 158 corresponds to approximately the thickness of a single envelope. A locking pawl 158*a* is disposed at the upper portion of the envelope dispensing plate 158. A solenoid 159 is disposed at the right side (in FIG. 9) of the hopper 151. When the solenoid 159 is energized, a plunger 160 is vertically moved in directions as indicated by arrows a and b. A coupling lever 161 is connected to the plunger 160. The coupling lever 161 is also connected to a projection 155*a* of a locking arm 155. One end of the locking arm 155 can engage with the locking pawl 158*a*, and the other end thereof is connected to a plate 163, fixed outside the hopper 151, through a spring 162. The locking arm 155 pivots about a projection 163*a* formed on the plate 163 in directions indicated by arrows c and d upon movement of the coupling lever 161. After a customer has pulled the handle 8, the handle 8 may be pushed back by the customer or may be automatically returned by a spring (not shown) to the closed position.

An envelope storage portion 164 (FIG. 8) is disposed inside the envelope insertion port 9. A convey path 165 for an envelope inserted at the envelope insertion port 9 comprises a plurality of paired conveyor rollers 166 and upper and lower guide plates 178 and 179. A shutter mechanism 167 and a printer 168 are disposed along the conveyance path 165 extending inward from the envelope insertion port 9 in the order named. The terminal end of the conveyance path 165 opposes a hopper 169. A thickness detector 200 is arranged at the pair of conveyance rollers 166 in the vicinity of the envelope insertion port 9 to detect whether or not the envelope conveyed upon rolling of a pinch roller 174 has a predetermined thickness. Each of envelope detectors 170, 171 and 172 comprises a known photocoupler of a light-emitting element and a photosensor. The envelope detector 170 serves to detect the presence of an envelope at the envelope insertion port, and the envelope detectors 171 and 172 are used for detecting the presence of an envelope during the printing operation. Each pair of the paired conveyor rollers 166 comprises a driver roller 173 and a pinch roller 174. A conveyor belt 175 is looped around the driver rollers 173. Each pinch roller 174 rotatably contacts the corresponding driver roller 173 through the conveyor belt 175. The driver rollers 173 are driven by a pulse motor 176. The shutter mechanism 167 is disposed between the envelope insertion port 9 and the pair of conveyor rollers 166 in the vicinity thereof so as to extend a shutter 177 across the conveyance path 165 or so as to withdraw the shutter 177 from across the conveyance path 165.

Figure 10:
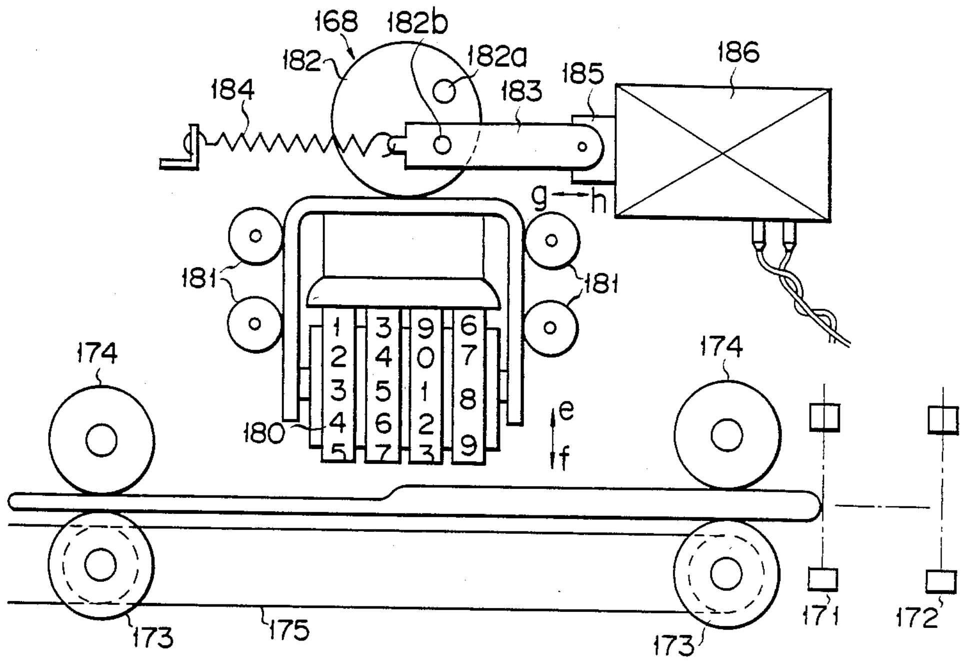
FIG. 10 is a sectional view showing a schematic construction of the printer.

FIG. 10 schematically shows the structure of the printer 168. An index stamper 180 having numerical figures embossed on its outer surface is disposed in the printer. The index stamper 180 is guided by guide rollers 181. The index stamper 180 is vertically moved while a cam plate 182 pivots about a shaft 182*a*. A coupling lever 183 is connected to a projection 182*b* of the cam plate 182. The coupling lever 183 is urged by a spring 184 which is hooked at one end of the coupling lever 183 in directions indicated by arrows e and f. A plunger 185 is connected to the other end of the coupling lever 183. When a solenoid 186 is energized, the plunger 185 is moved along directions indicated by arrows g and h. When the leading end of an envelope is detected by the envelope detector 171, the pulse motor 176 (FIG. 8) is stopped, and the solenoid 186 is energized, thereby moving the index stamper 180 and printing a numeric stamp on the envelope. When the pulse motor 176 is then driven and the envelope detector 172 detects the leading end of the envelope, the pulse motor 176 is stopped again and the solenoid 186 is energized, thereby moving the index stamper 180 and printing another numeric stamp on the envelope.

The hopper 169 (FIG. 8) stores envelopes which have been sequentially conveyed along the conveyance path 165. The hopper 169 comprises a guide plate 187, a table 188, a support member 189 for keeping the envelopes upright on the table 188, and a spring 190 for urging the support member 189 in directions indicated by arrows i and j, as shown in FIG. 8.

Figure 11:
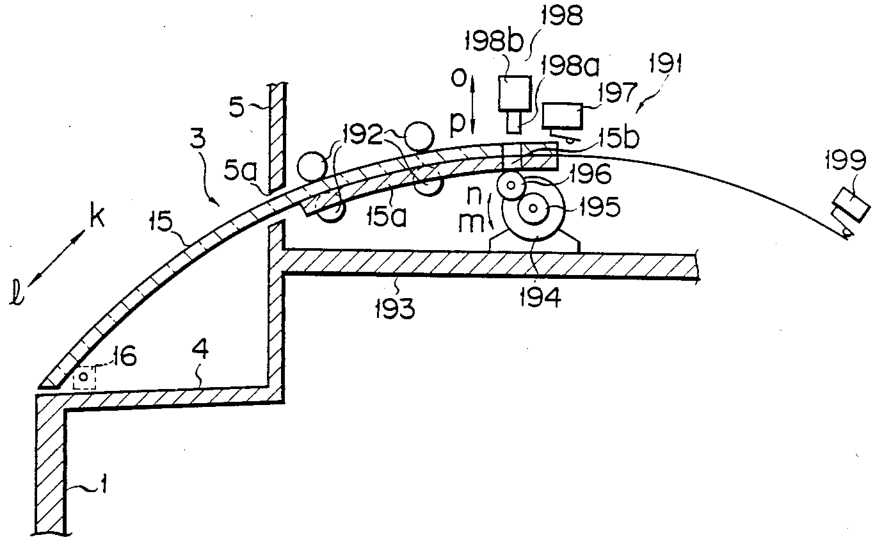
FIG. 11 is a sectional view showing a shutter reception mechanism of the machine shown in FIG. 1.

FIG. 11 shows a shutter receiving mechanism 191 for receiving the arcuated shutter 15. The shutter 15 comprises part of a cylinder having a predetermined radius of curvature. The shutter is supported between pairs of rollers 192 in the housing 1. The shutter 15 slides from the inside of the housing 1 through an opening 5*a* in the vertical operation panel 5 so as to close off the operation section 3. A DC motor (driving section) 194 is mounted on a partition plate 93 disposed substantially at the center of the housing 1. A rubber roller 195 is mounted on a rotating shaft of the DC motor 194. The rubber roller 195 is brought into tight contact with a rubber roller 196. The rubber roller 196 is mounted directly on a power transmission member 15*a* (e.g., a plastic plate) disposed at part of the lower portion of the arcuated shutter 15. Upon rotation of the DC motor 194, the arcuated shutter 15 is moved in directions indicated by arrows k and l. A detector 197 is arranged in the vicinity of a position corresponding to an end portion of the shutter 15 inside the housing 1 when the arcuated shutter 15 is closed to cover the operation section 3. The detector 197 detects the closed state of the arcuated shutter 15. A locking mechanism 198 is disposed to lock the arcuated shutter 15 in the closed position. A detector 199 is arranged in the vicinity of a position corresponding to the end portion of the arcuated shutter 15 when the shutter is received inside the housing 1. The detectors 197 and 199 comprise microswitches, respectively, and are turned on/off by the arcuated shutter 15.

The locking mechanism 198 comprises: a fitting member 198*a* which fits across the opening 15*b* which receives the arcuated shutter 15; and a solenoid 198*b* for vertically (in directions indicated by arrows o and p) moving the fitting member 198*a*. The shutter receiving mechanism 191 is disposed above the first and second units, or between a unit and a partition plate.

Figure 12:
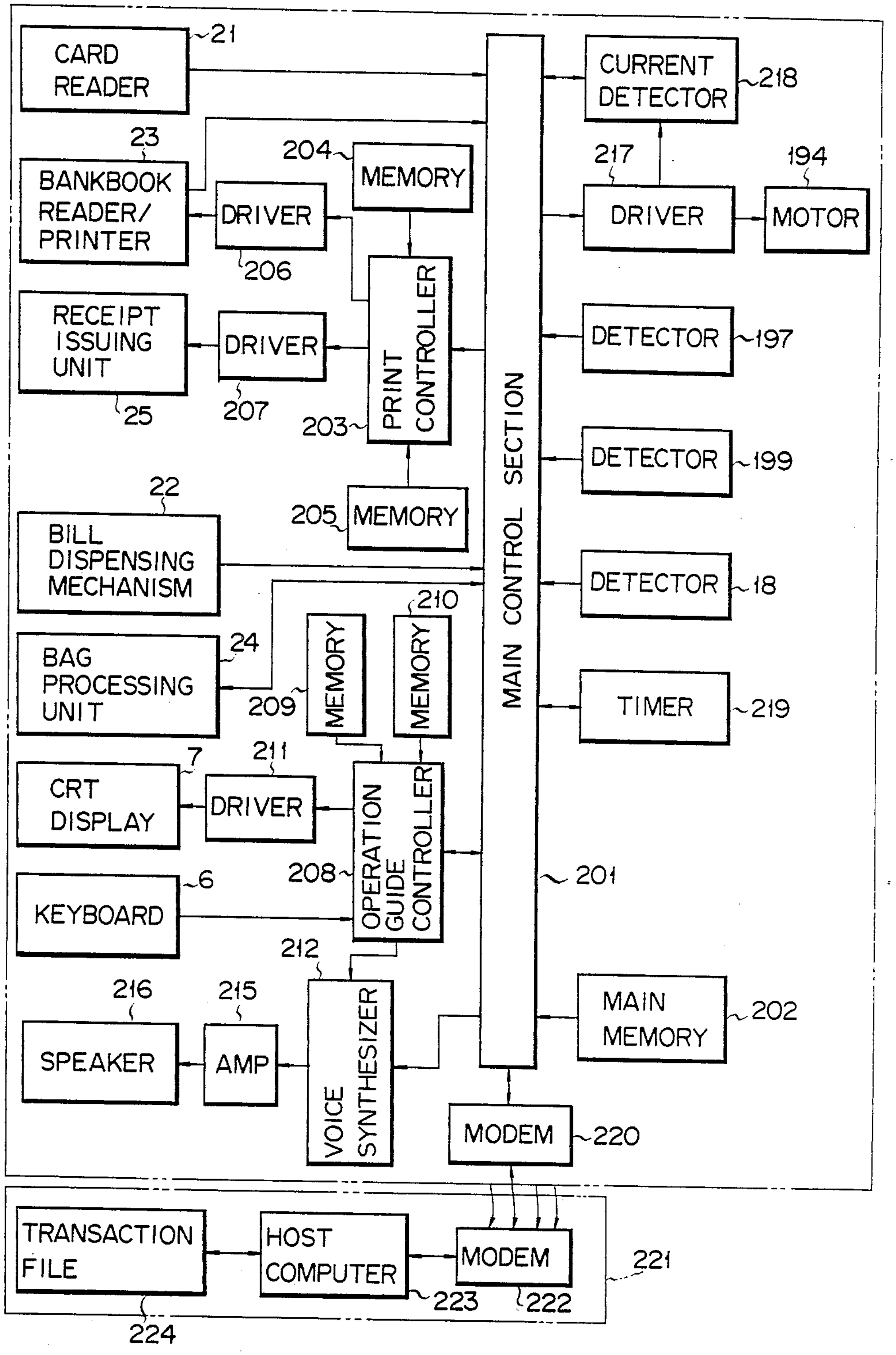
FIG. 12 is a block diagram showing the overall configuration of the machine shown in FIG. 1.

FIG. 12 is a block diagram of the control system of the automatic teller machine. A main control section 201 controls the automatic teller machine as a whole. A main memory 202 comprises a ROM (read-only memory) which stores a control program and the like. A print controller 203 controls production of print data corresponding to either English pattern data stored in a memory 204 or Japanese pattern data stored in a memory 205. A driver 206 drives the printer 135 in the passbook reader/printer 23 in accordance with print data from the print controller 203. A driver 207 drives a printer in the receipt issuing unit 25 in accordance with print data from the print controller 203. An operation/guide controller 208 controls production of display data corresponding to either Japanese pattern data stored in a memory 209 or English pattern data stored in a memory 210, in accordance with a signal from the main control section 201. The operation/guide controller 208 produces operation data or a voice selection signal in accordance with a key input at the keyboard 6. A driver 211 drives the CRT display 7 in accordance with display data or operation data from the operation/guide controller 208. A voice synthesizer 212 produces a voice signal corresponding to either Japanese voice data or English voice data at a speaker 216 through an amplifier 215 in accordance with the voice selection signal so as to produce guidance messages at the speaker 216. Since the speaker 216 is disposed inside the arcuated shutter 15 when the shutter 15 is closed, the speaker 216 is protected against rain and wind, thereby lengthening its service life. A driver 217 drives the motor 194 in the forward or reverse direction in accordance with an open/close driving signal from the main control section 201. The driver 217 causes the motor 194 to stop/drive in response to a detection signal from a current detector 218. The current detector 218 detects a driving current of the driver 217. In this case, the current detector 218 detects a current of a different level in the case of driving the motor 194 in the forward direction (i.e., direction indicated by arrow m) than in the case of driving the motor 194 in the reverse direction (i.e., direction indicated by arrow n).

When the arcuated shutter 15 is open and the foreign matter detector 18 detects foreign matter, the main control section 201 causes a timer 219 to operate. When a predetermined time interval has elapsed, the timer 219 produces a timeout signal. The timeout signal causes a close driving signal for closing the arcuated shutter 15 to be supplied to the driver 217. The main control section 201 performs data exchange with a central processing unit 221 through a modem 220. The central processing unit 221 comprises: a modem 222 for controlling data transfer, a host computer 223 for controlling data processing, and a transaction data file 224 for filing transaction data.

Figure 13:
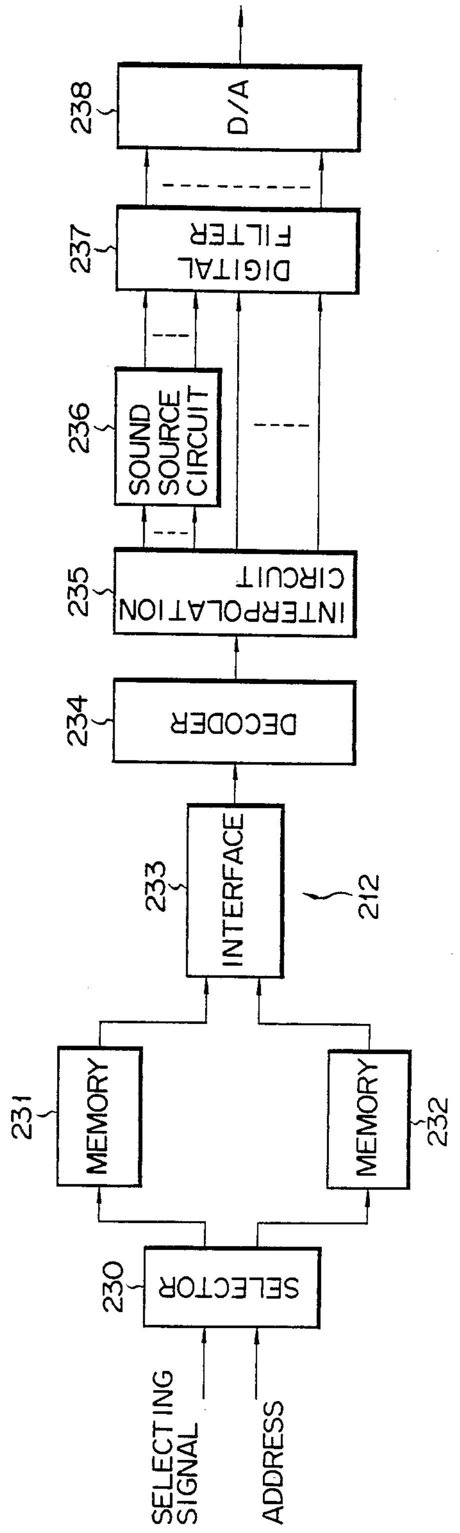
FIG. 13 is a block diagram showing the overall arrangement of a voice synthesizer of the machine shown in FIG. 1.

The voice synthesizer 212 will be described in detail with reference to FIG. 13. A selector 230 receives a start address (of voice data) from the main control section 201 and produces it to a memory 231 or 232 in accordance with the selecting signal from the operation/guide controller 208 so as to read out either Japanese or English voice data, respectively.

The memory 231 stores data which comprises speech parameters corresponding to various types of Japanese sounds. These parameters are a reference frequency, a difference between voiced and voiceless sounds, and a sound source magnitude, all of which are included in glottal characteristics. The memory 232 stores data which comprises speech parameters corresponding to various types of English sounds. These parameters are a reference frequency, a difference between voiced and voiceless sounds, and a sound source magnitude, all of which are included in glottal characteristics.

Output data from one of the memories 231 and 232 is supplied to a decoder 234 through an interface 233. The decoder 234 decodes each of the speech parameter data supplied thereto and converts it to serial data. An output signal from the decoder 234 is supplied to an interpolation circuit 235. The interpolation circuit 235 performs linear interpolation at several arbitrary points of a frame (duration of periodic updating of speech parameters) for all the speech parameters of a predetermined bit number so as to smoothly update the speech parameters from one frame to another.

Sound source data from the interpolation circuit 235 is supplied to a sound source circuit 236. The sound source circuit 236 produces periodic impulses (white noise signals) in accordance with the supplied sound source data. An output signal from the sound source circuit 236 is supplied to a digital filter 237 which then synthesizes a voice signal by adding a correlation factor in accordance with a filter coefficient. It should be noted that the correlation factor has been eliminated from the interpolation circuit 235 in the process of analysis. The digital filter 237 comprises a known circuit of a pipeline multiplier, an adder/subtractor and a delay circuit, none of which are illustrated. Each bit output signal from the digital filter 237 is supplied to a digital-analog converter (D/A converter) 238. The signal (i.e., the synthesized voice signal) converted by the D/A converter 238 is amplified by the amplifier 215 and is supplied to the speaker 216. The sounds are then produced at the speaker 216.

Figure 14:
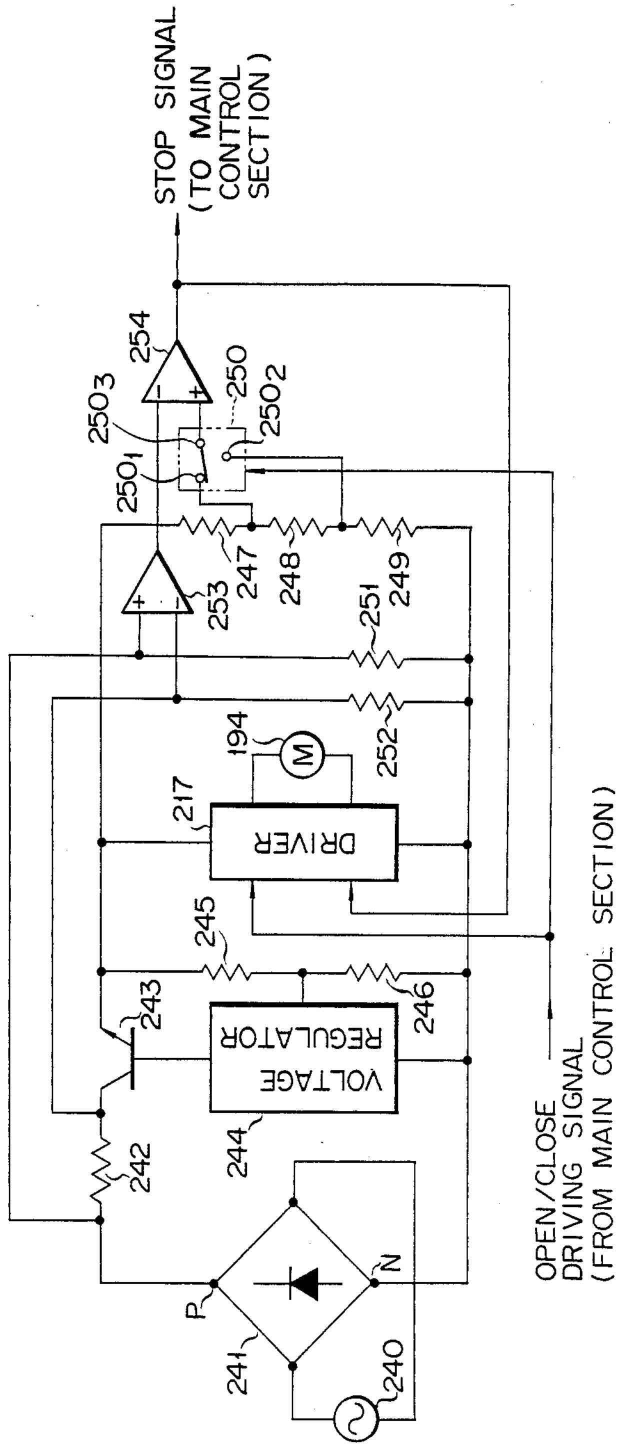
FIG. 14 is a circuit diagram showing a current detector of the machine shown in FIG. 1.

FIG. 14 is a circuit diagram of the shutter receiving mechanism 191. Two terminals of an AC power supply 240 are connected to DC input terminals of a rectifier 241, respectively. A DC positive output terminal P of the rectifier 241 is connected to the collector of an npn transistor 243 through a resistor 242. A constant voltage circuit 244 is connected between the base of the npn transistor 243 and a DC negative output terminal N of the rectifier 241. A series circuit (of resistors 245 and 246), the driver circuit 217 and a series circuit (of resistors 247, 248 and 249) are respectively connected between the emitter of the npn transistor 243 and the output terminal N. The output terminal of the constant voltage circuit 244 is connected to a node between the resistors 245 and 246. The driver 217 drives the motor 194 in the forward or reverse direction in accordance with an open/close driving signal from the main control section 201. The driver 217 also stops the motor 194 in accordance with an output signal from a differential amplifier 254 to be described later. A contact $250_1$ of a switch 250 is connected to a common node between the resistors 247 and 248. A contact $250_2$ of the switch 250 is connected to a common node between the resistors 248 and 249. The switch 250 is switched by the open/-close driving signal from the main control section 201. A resistor 251 is connected between the output terminals P and N. A resistor 252 is connected between the collector of the npn transistor 242 and the output terminal N. The noninverting input terminal of a differential amplifier 253 is connected to a common node between the output terminal P and the resistor 251. The inverting input terminal of the differential amplifier 253 is connected to a common node between the collector of the npn transistor 243 and the resistor 252. The differential amplifier 253 produces a predetermined current which is obtained by subtracting a current at the resistor 242. The output terminal of the differential amplifier 253 is connected to the inverting input terminal of the differential amplifier 254. A movable contact $250_3$ of the switch 250 is connected to the noninverting input terminal of the differential amplifier 254. The output terminal of the differential amplifier 254 is connected to the input terminal of the driver 217. The output signal from the differential amplifier 254 is supplied as a stop signal to the main control section 201.

The operation of the automatic teller machine having the above construction will be described with reference to the flow charts in FIGS. 15-1 through 15-27.

The customer reads the operation guide message (step 301) "Insert Card or P/B (Passbook)" displayed at the CRT display 7 and inserts his card at the card insertion port 13 (step 303). The data on the magnetic stripe of the card is read by the magnetic head 34 and is supplied to the main control section 201. The main control section 201 checks the validity of the card (step 305). If it is determined that the card is valid, a print signal is supplied from the main control section 201 to the print controller 203. The print controller 203 reads out from the memory 204 data indicating the account number, the bank code and the bank branch code corresponding to the data read by the card reader 21. The display pattern signal is supplied to the driver 206 and is printed on the journal paper roll 139 by the printer 135 in the passbook reader/printer 23 (step 307).

When the main control section 201 detects that the card can be used (step 309), the solenoid **198*b* is energized to move the fitting member 198*a* upward, and the fitting member 198*a* is disengaged from the opening 15*b* of the arcuated shutter 15. As a result, the lock of the arcuated shutter 15 is released. Thereafter, the main control section 201 supplies a drive signal to the driver 217 so as to rotate the motor 194 in the direction indicated by arrow m. Upon rotation of the motor 194, the rubber rollers 195 and 196 are rotated, and the arcuated shutter 15 is moved in the direction of arrow k (step 321). However, when the main control section 201 detects in step 309 that the card cannot be used, a guide message "Retain Card or P/B" is displayed at the CRT display 7 (step 311**) and the card is either conveyed into the machine. Depending on the type of the card, the card may be returned to a user.

Assume that the customer inserts the passbook in the passbook insertion port 12 in response to the operation guide message "Insert Card or P/B" (step 315). The data on the magnetic stripe of the passbook is read by the magnetic head 147 and is supplied to the main control section 201. The reading portion 148 reads the last printed line and the page mark indicating a page of the passbook. These data are also supplied to the main control section 201. As a result, the main control section 201 checks the passbook to determine whether all the lines of a given page are empty of printed data (i.e., a page not used at all), or the upper half lines thereof contain printed data (a half-used page) or all the lines thereof contain printed data (a page used fully) (step 318). As shown in FIG. 15-27, it is checked if the page of the passbook which is read by the reading portion 148 is partially printed (step 823). If NO in step 823, it is checked in step 825 if this page is a new page. If NO in step 825, this page is detected as a fully used or printed page. The main control section 201 causes the CRT display 7 to display the guide message "Turn to New Page" (step 826). The main control section 201 compares the page data recorded on the magnetic stripe with the page data represented by the page mark in step 833. If the page data recorded on the magnetic stripe is greater than or equal to that represented by the page mark, the page data on the magnetic stripe is updated or incremented by one by means of the magnetic head 147 (step 835), and the passbook or bankbook is discharged from the passbook insertion port 12 (step 837). However, if YES in step 825, the main control section 201 checks if the page data written on the magnetic stripe coincides with the page data represented by the page mark (step 827). If no coincidence is obtained, the main control section 201 causes the CRT display 7 to display the guide message "Turn to Previous Page" (step 829). The passbook is then discharged from the passbook insertion port 12 (step 831).

Assume that the passbook is inserted in the machine such that it is open at an empty page. However, when the page data recorded on the magnetic stripe does not coincide with that represented by the page mark, the passbook is returned to the customer. Subsequently, a message is prompted to instruct the customer to open the passbook at the immediately previous page and insert the passbook again in the passbook insertion port. However, if this immediately previous page is fully used or printed, the page data on the magnetic stripe is updated as the next page, and the passbook is returned to the customer. Under this condition, when the customer re-inserts the bankbook open at the next page, the page data recorded on the magnetic stripe coincides with the page data represented by the page mark. Therefore, this page is regarded as a valid page and the desired transaction can be performed. As a result, in a bank using an automatic teller machine having a write function and an automatic teller machine having no write function, an erroneous operation wherein the customer inserts his passbook opened at an improper page and data is disconnectedly printed on the improper page will not occur in the automatic teller machine of the present invention.

When the main control section 201 detects in step 823 that the page is partially printed or in step 827 that the page data recorded on the magnetic stripe coincides with that of the page mark, the flow returns to the start.

Referring again to FIG. 15-1, the main control section 201 checks the passbook and generates a print signal to the print controller 203. The print controller 203 reads out from the memory 204 the character pattern indicating the account number, the bank code and the bank branch code, and supplies the display pattern to the driver 206. The driver 206 drives the printer 135 in the passbook reader/printer 23 to print the data on the journal paper roll 139 (step 319).

When the main control section 201 detects the format and validity of the passbook (steps 320 and 322), the automatic teller machine is operated in the same manner as in the case of the card to open the arcuated shutter 15 (step 321). When the passbook format is not correctly detected (i.e., when a direction error of the passbook inserted in the machine occurs, an illegal format is detected, a P/B is fully used, no page mark is detected, or a page error is detected) and when the main control section 201 determines that the P/B is fully used (step 353), the guide message "P/B Fully Used" is displayed at the CRT display 7 (step 355), and the passbook is discharged from the passbook insertion port 12. Otherwise, the guide message "Reinsert P/B" is displayed at the CRT display 7 (step 361), and the passbook is discharged from the passbook insertion port 12. When the customer removes the passbook in accordance with the above guide message (step 357), the automatic teller machine restores the customer waiting mode (step 301). However, when the passbook is discharged to appear at the passbook insertion port 12 and the customer does not remove the passbook within a predetermined time interval (i.e., when the main control section 201 starts the timer 219 at the time of discharge of the passbook and does not receive a passbook removal signal from the photosensor 123 in the passbook reader/printer 23), the passbook is recovered in the manner to be described later. When the main control section 201 detects that the passbook is unusable (step 322), the main control section 201 causes the CRT display 7 to display the guide message "Retain Card or P/B" (step 324), and the passbook is recovered into or retained by the automatic teller machine (step 326).

The main control section 201 then causes the CRT display 7 to display the guide message "Enter Personal Identification Number (PIN)" (step 323). When the customer enters the confidential number for his account at the keyboard 6 (step 325), the key input signal is supplied from the operation/guide controller 208 to the main control section 201. The main control section 201 checks whether or not the confidential number read by the card reader 21 coincides or associates with that entered at the keyboard 6 (step 327). When a coincidence is established or an association satisfies a predetermined range of rules, the main control section 201 detects that the customer is the proper customer of the card or passbook and checks if a count of the retry counter is three (step 329). When the count of the retry counter is not three, the count is reset or rewritten to be three (step 331). In this condition, the flow advances to the next step. However, when neither a coincidence nor an association is established, the main control section 201 causes the retry counter to count down (step 333). The main control section 201 then checks whether or not the count of the retry counter is zero (step 335). When the count of the retry counter is zero, it is rewritten to zero (step 337), and the guide message "Retain Card or P/B" is displayed at the CRT display 7 (step 339). As a result, the card or passbook is recovered into or retained by the machine (steps 341 through 345). However, when the count of the retry counter is not zero, the guide message "Incorrect PIN. Enter PIN again or Depress Cancel Button" is displayed on the CRT display 7 (step 347). When the cancel button is depressed, the main control section 201 is operated to rewrite the retry count (step 351). The dispensing operation of the card or passbook is performed, to be described later. When the customer enters his PIN again, the flow is restarted from step 325.

When the PIN is correctly entered and the count of the retry counter is rewritten to three (step 329), the main control section 201 checks if the inserted transaction medium is a card or passbook (step 365). If it is determined that a card is inserted, the account number data (i.e., for a representative account of a plurality of accounts) recorded on the magnetic stripe is transmitted to the host computer 223 (step 367). As a result, the host computer 223 transmits to the main control section 201 several account data (stored in the transaction data file 224) corresponding to the representative account number, data indicating the types of a plurality of accounts, and account status signals. When the main control section 201 receives these messages from the host computer 223 (step 369), the main control section determines whether or not the accounts can be used for transactions (i.e., whether the status words are valid or invalid) (step 371). When the main control section 201 determines or detects that the status word is valid, the main control section 201 checks if a single account number is present (step 373). When the main control section 201 determines that a plurality of account numbers are present, the main control section 201 causes the CRT display 7 to display the guide message "Please Select Account" (please select one account among the plurality of accounts), as shown in FIG. 16, and to display a message indicating how to select the desired account (step 375). This display scheme is defined as a multi-account scheme. According to the multi-account scheme, a single customer need not have a plurality of cards and can select a desired account. In this case, when an account selection is not performed within a given time interval, the card is captured or retained in the automatic teller machine. However, when the main control section 201 determines that the status word is invalid, the cause of invalidity is displayed at the CRT display 7; one of the messages indicating a non-existent account, a stolen card or a disabled request is displayed (step 379). The main control section 201 checks if the card captured flag in the message sent by the host computer 223 is set at logic "0" or "1" (step 381). When the flag is set at logic "1", the card is retained (step 383). However, when the flag is set at logic "0", the card is discharged from the card insertion port 13. When the card is subsequently removed from the card insertion port 13 (step 385), the automatic teller machine is set in the standby mode to await the next customer. When the card is not removed by the corresponding customer, the card is retained by the machine.

When the customer selects the transaction account in the selection of transaction accounts displayed at the CRT display 7 (step 377), when the selected transaction account is single, or when the passbook is inserted, the main control section 201 causes the CRT display 7 to display the guide message "Please Select Transactions". At the same time, a message is displayed indicating the transaction key selection corresponding to the desired transactions (steps 387 and 389). For example, when the transaction account is a checking account, the customer can select from among the items "payment" ("withdrawal"), "deposit", "bank transfer", "balance inquiry", "receipt request", "check request" and "saving account", as shown in FIG. 17. When the transaction account is a account, the customer can select from among the items "payment", "deposit", "bank transfer", "balance inquiry" and "passbook request". When the transaction account is a credit account, the customer can select from among the items "credit", "cash refund", "bank transfer refund", and "receipt request". When the passbook is used, the customer can select from among the items "payment", "deposit", "bank transfer", "passbook update" and "bankbook (passbook) request". In this manner, the customer can select any item in accordance with the type of account and use/nonuse of the passbook. As a result, selection errors are minimized. When the customer does not select a transaction account within a predetermined time interval, the card or passbook is retained by the machine.

The customer enters data indicating the type of transaction at the keyboard 6 upon confirmation of the items displayed at the CRT display 7 (step 391). In this case, the main control section 201 checks the selection (step 393) and checks if the selection is valid (step 395). If it is determined that the selection is not valid (i.e., when hardware trouble is detected, or the receiving and dispensing units for bills or envelopes are respectively full or empty), the main control section 201 causes the CRT display 7 to display the message "Out of Money, Depress Cancel Button" (step 397) or the message "Request Cannot Be Processed. Depress Cancel Button" (step 399). When the customer depresses the cancel button in accordance with either one of these messages (step 401), the card or passbook is discharged such that the the leading end appears at the corresponding dispensing (insertion) port, and after a predetermined time interval has elapsed without its removal by the customer, the card or passbook is retained by the machine. The card or passbook dispensing operation is shown in FIG. 15-18.

The main control section 201 causes the CRT display 7 to display the guide message "Remove Card or P/B" (step 671). The card or passbook is discharged from the card insertion port 13 or the passbook insertion port 12. The customer removes the card or passbook in accordance with the guide message (steps 675 and 677).

When a transaction cannot continue during the operation, the machine causes the customer to depress the cancel button, and his card or passbook is returned to him. In this sense, the customer must read the contents displayed at the CRT display 7, and can properly check the cause of transaction interruption.

When the customer has left the machine without implementing the required procedure, the main control section 201 can recognize the incomplete operation before discharging the card or P/B.

Figures 1, 15:
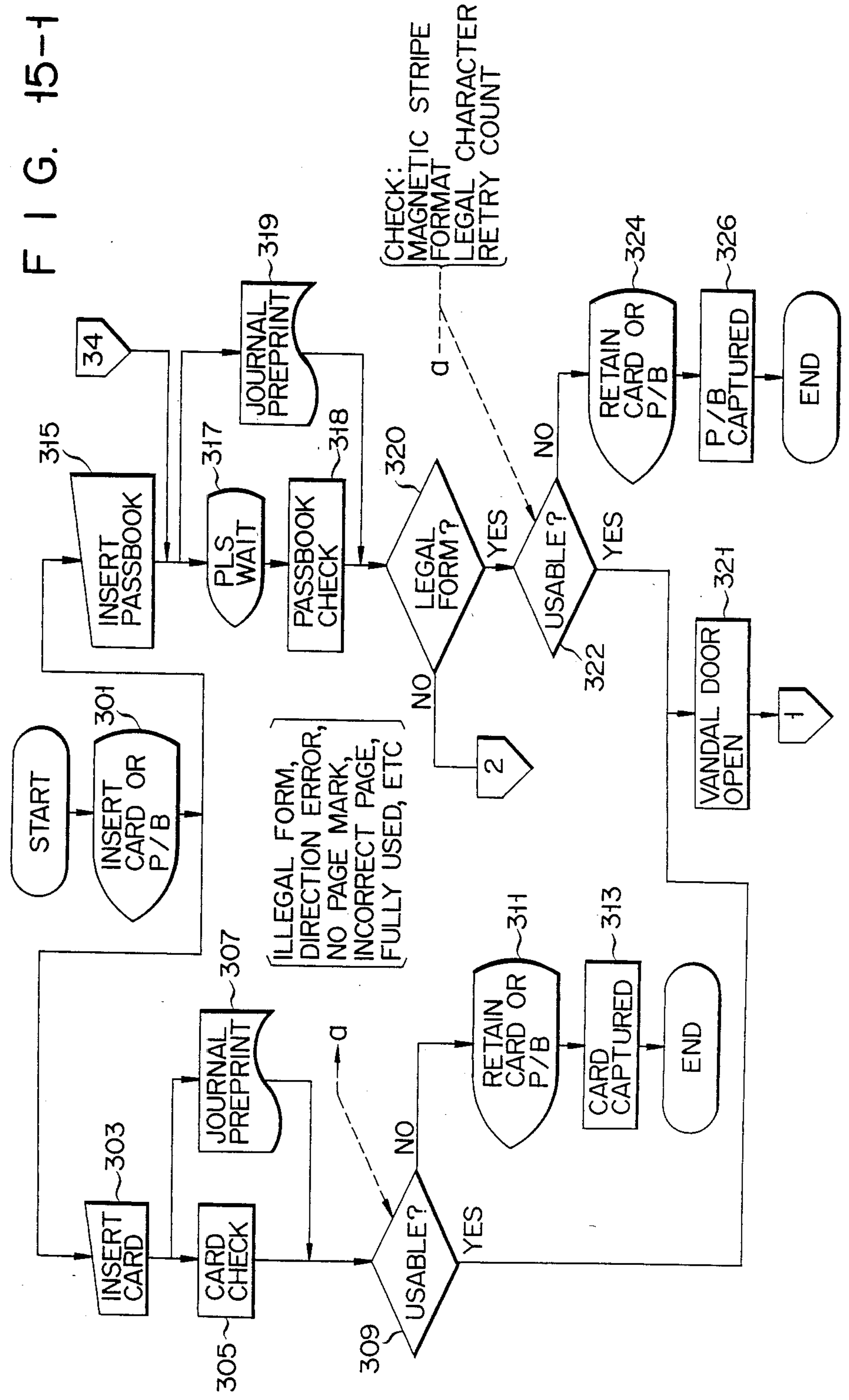
Figures 2, 15:
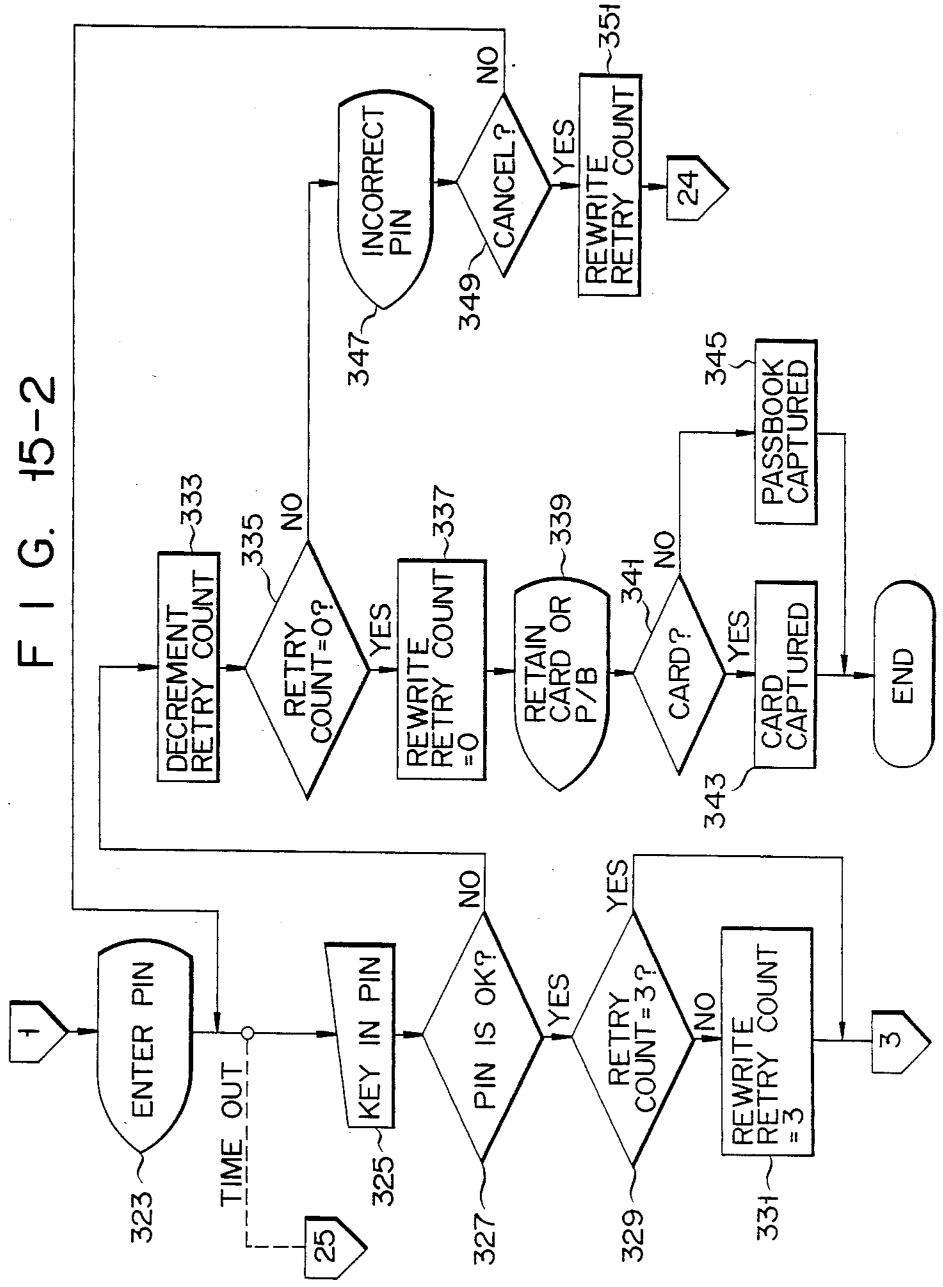
Figures 3, 15:
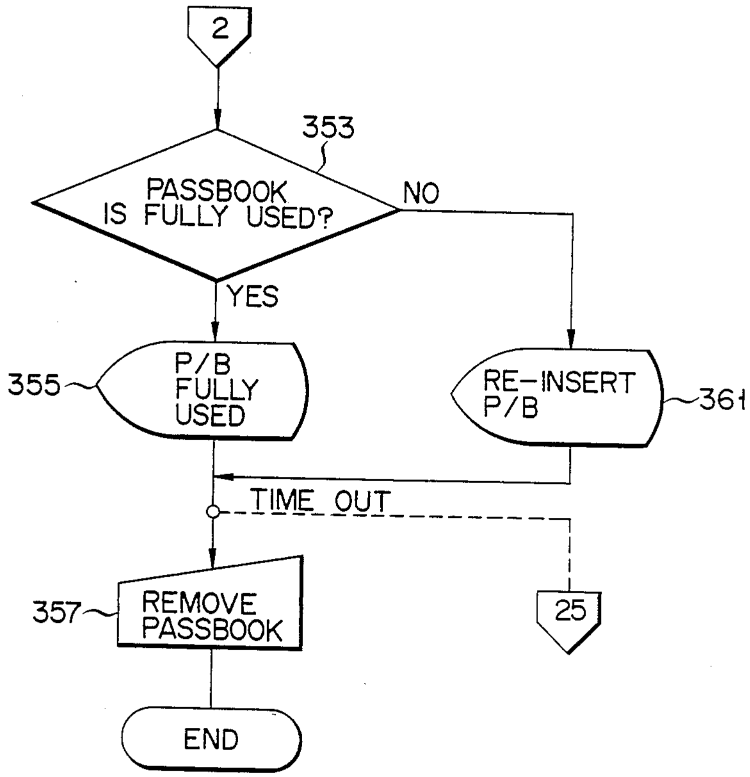
Figures 4, 15:
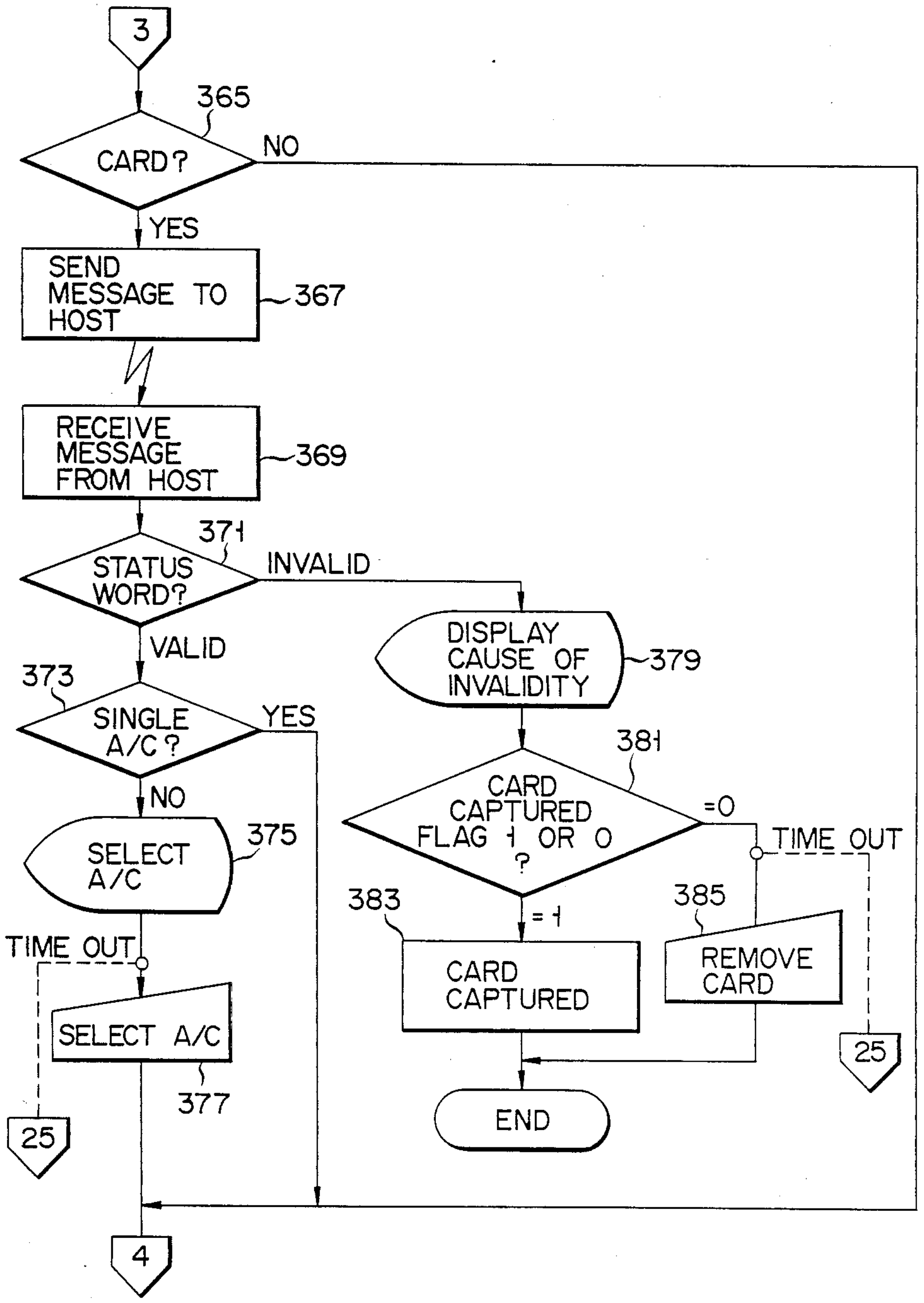
Figures 5, 15:
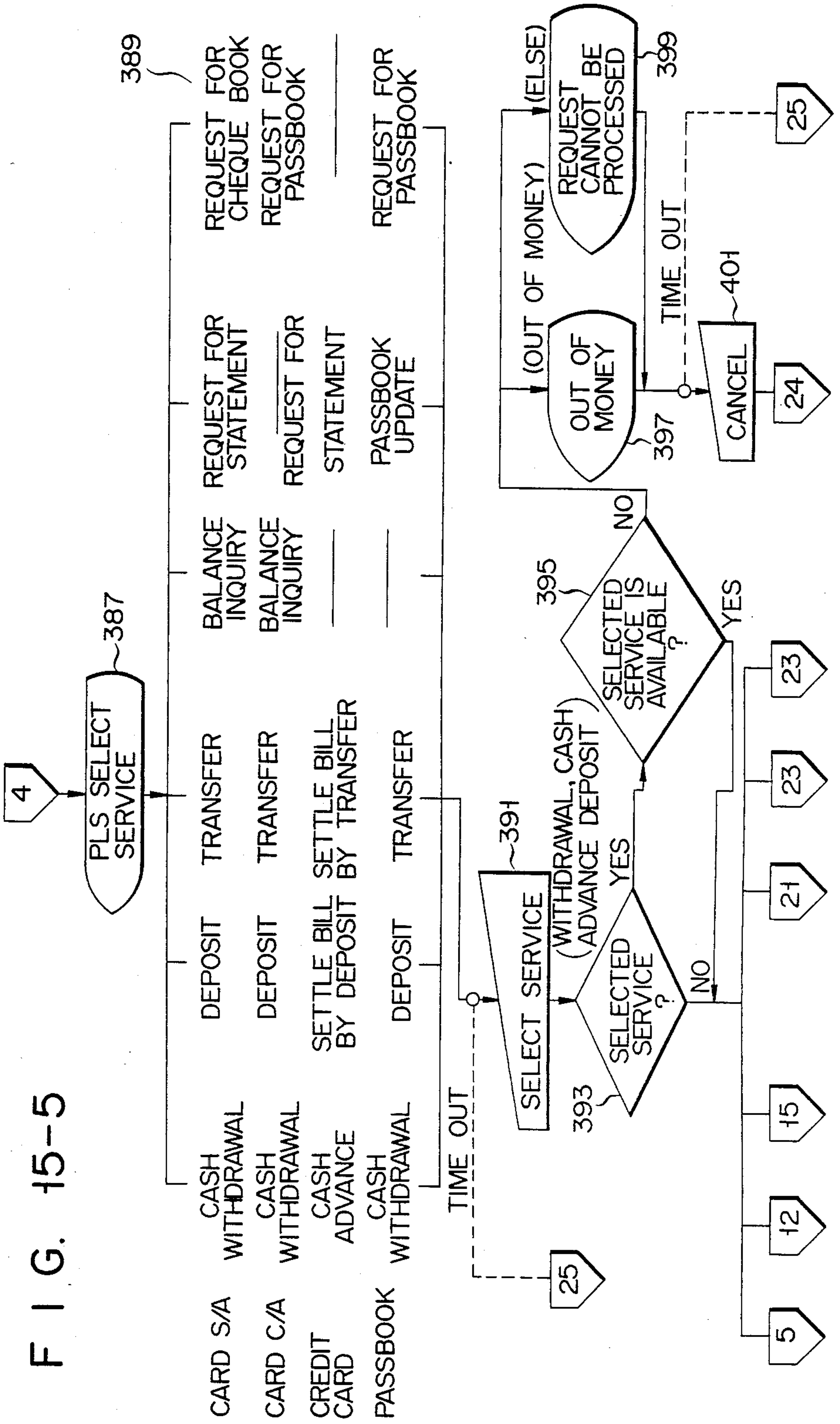
Figures 6, 15:
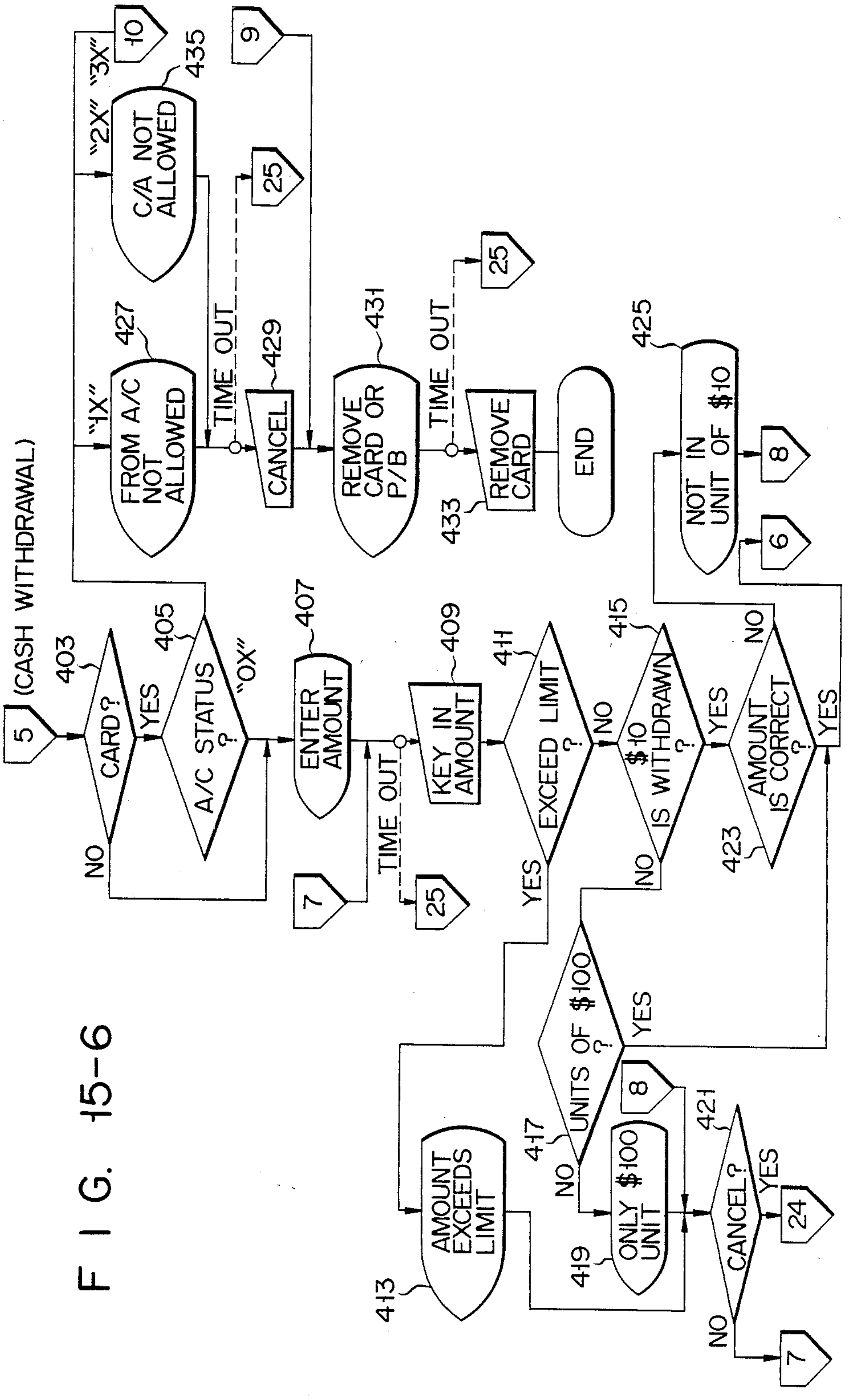
Figures 7, 15:
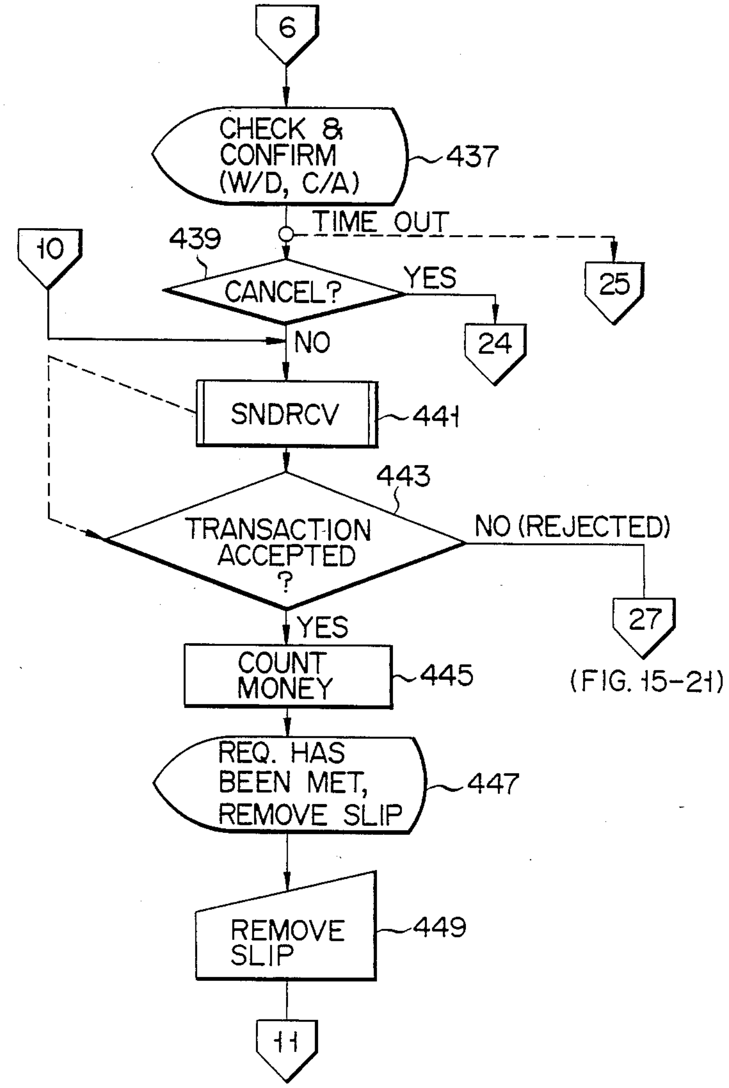
Figures 8, 15:
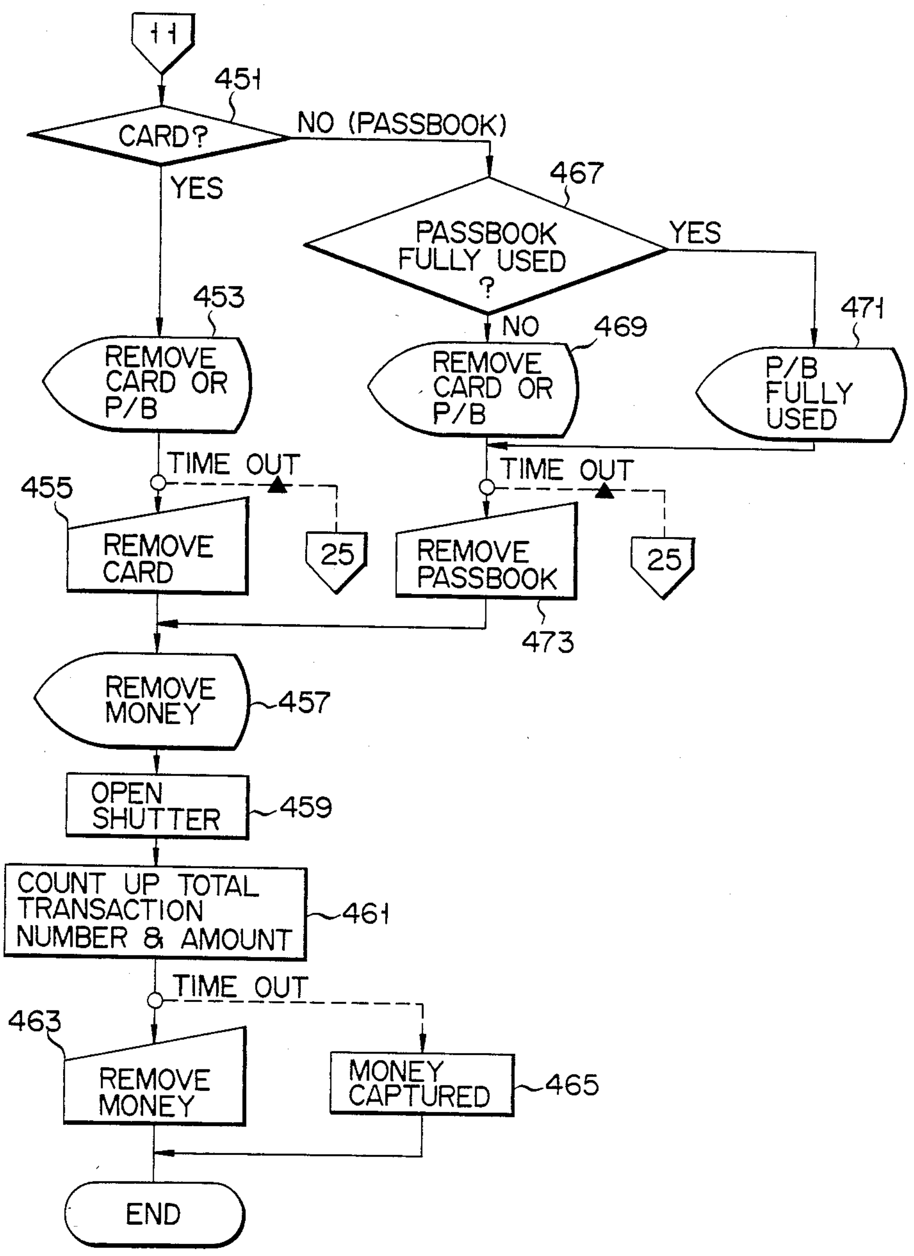
Figures 9, 15:
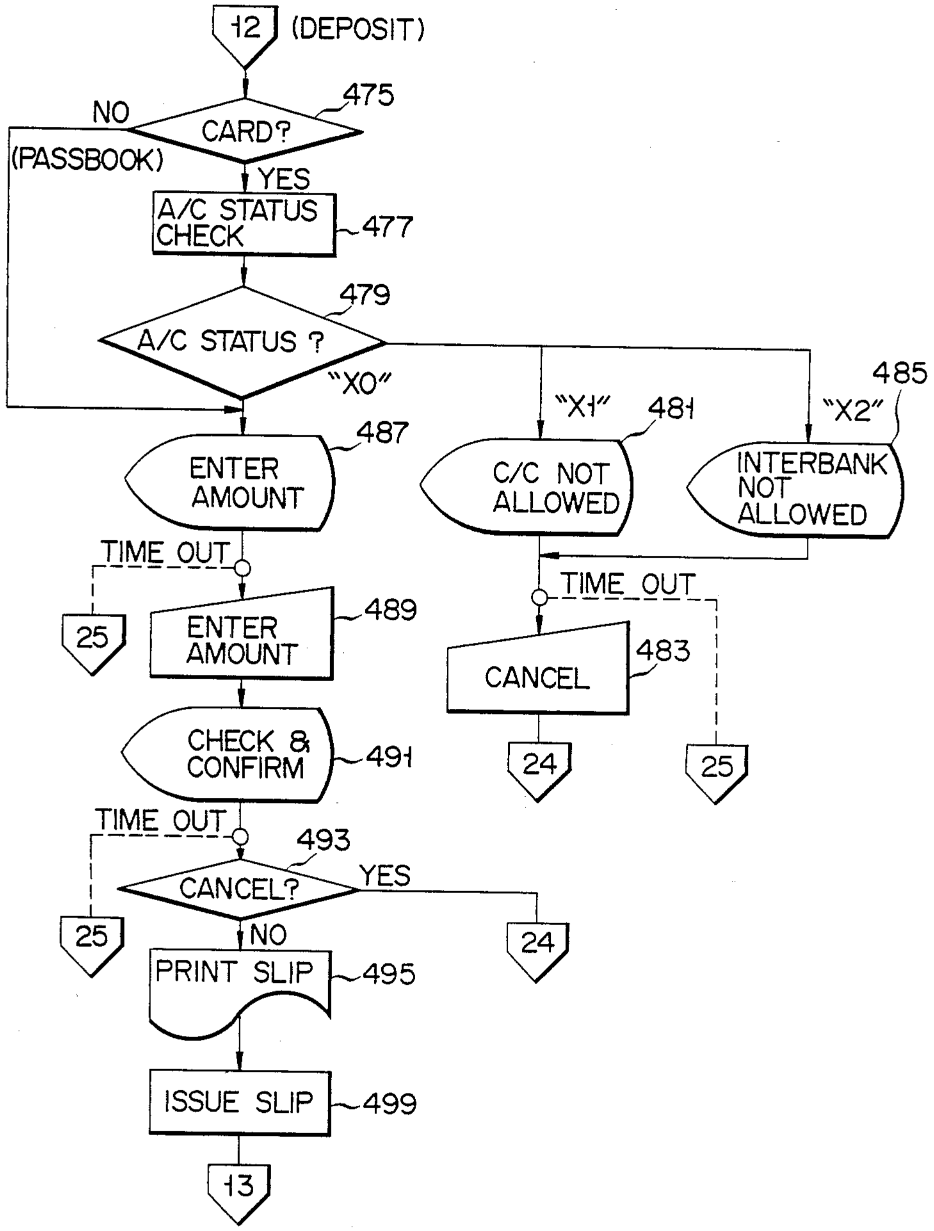
Figures 10, 15:
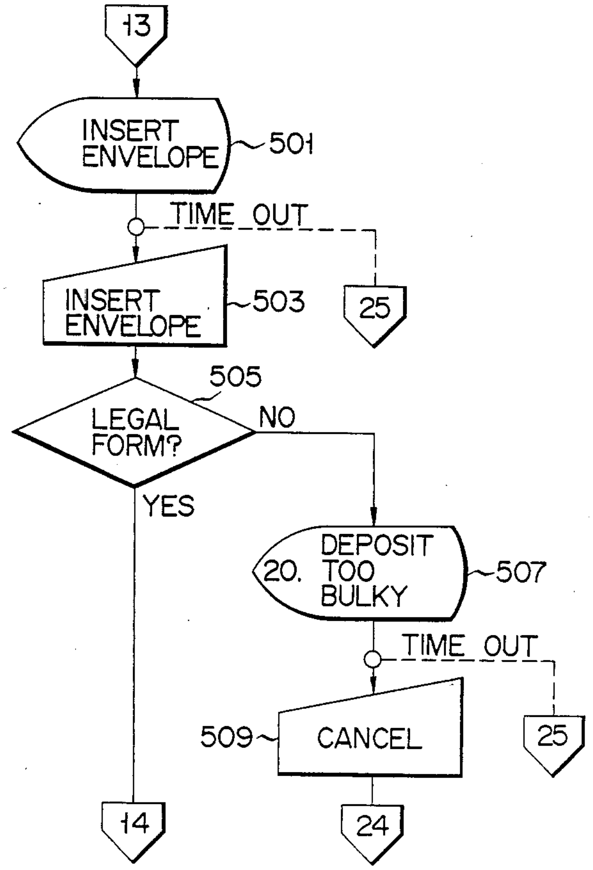
Figures 11, 15:
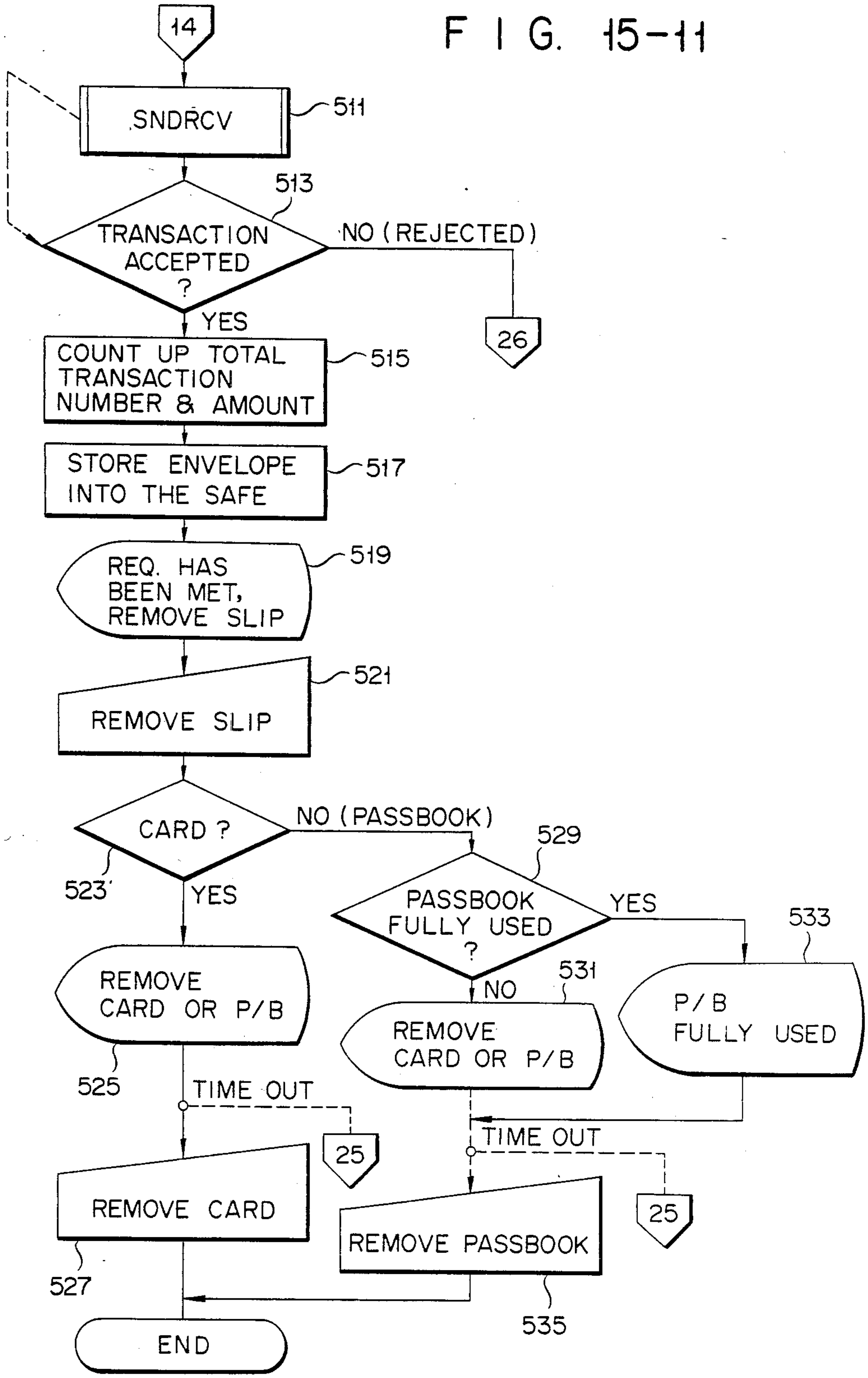
Figures 12, 15:
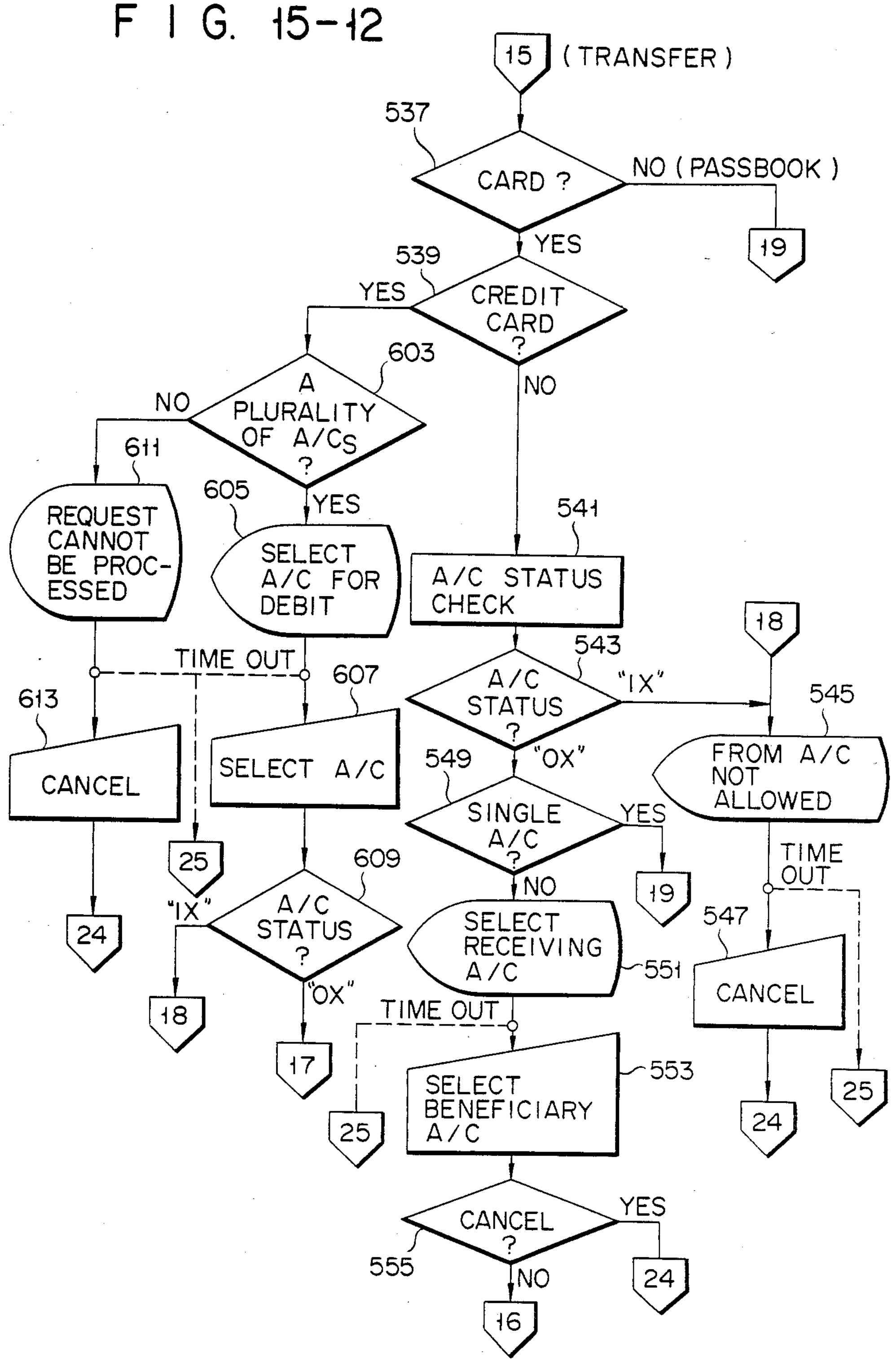
Figures 13, 15:
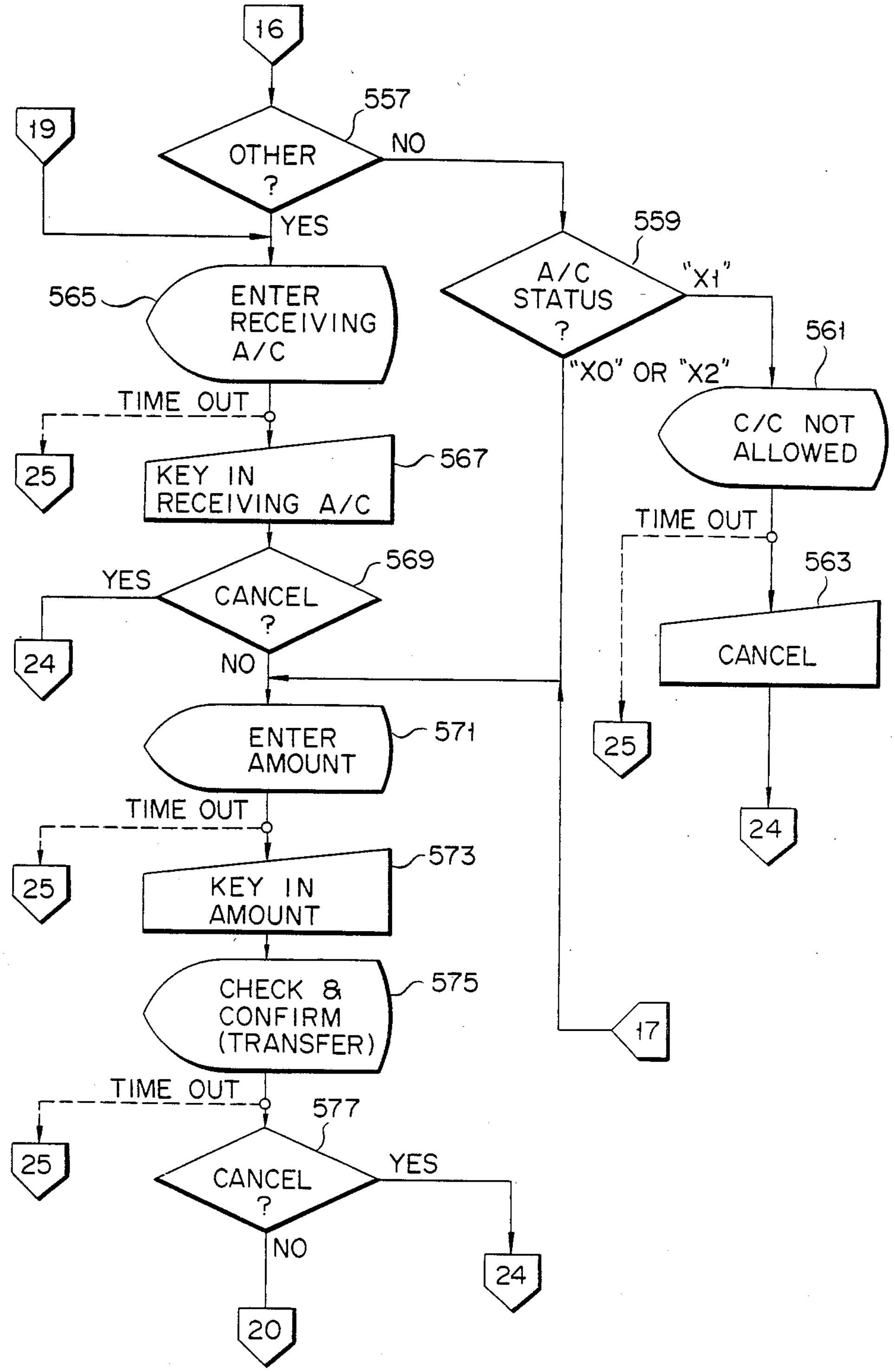
Figures 14, 15:
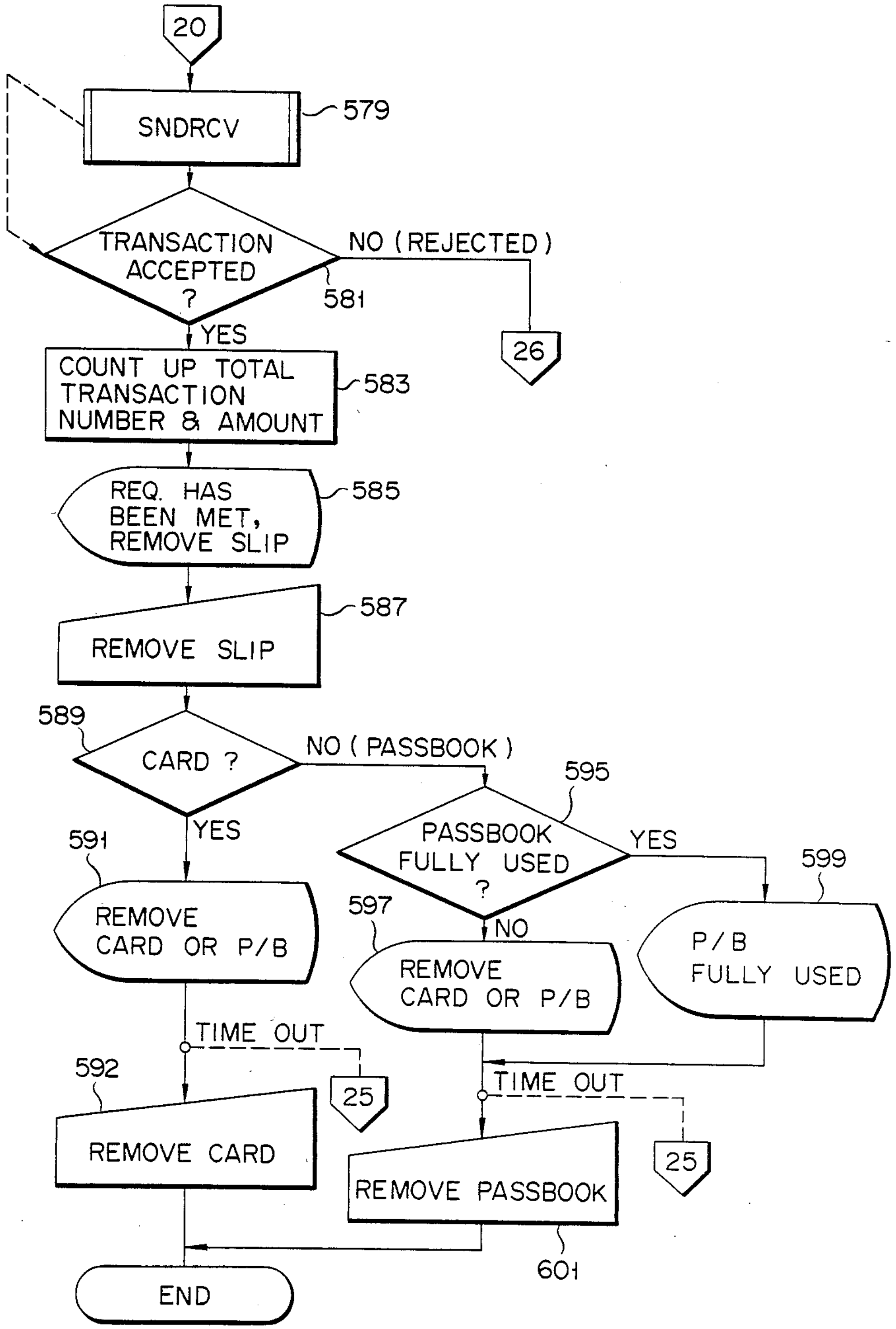
Figure 15:
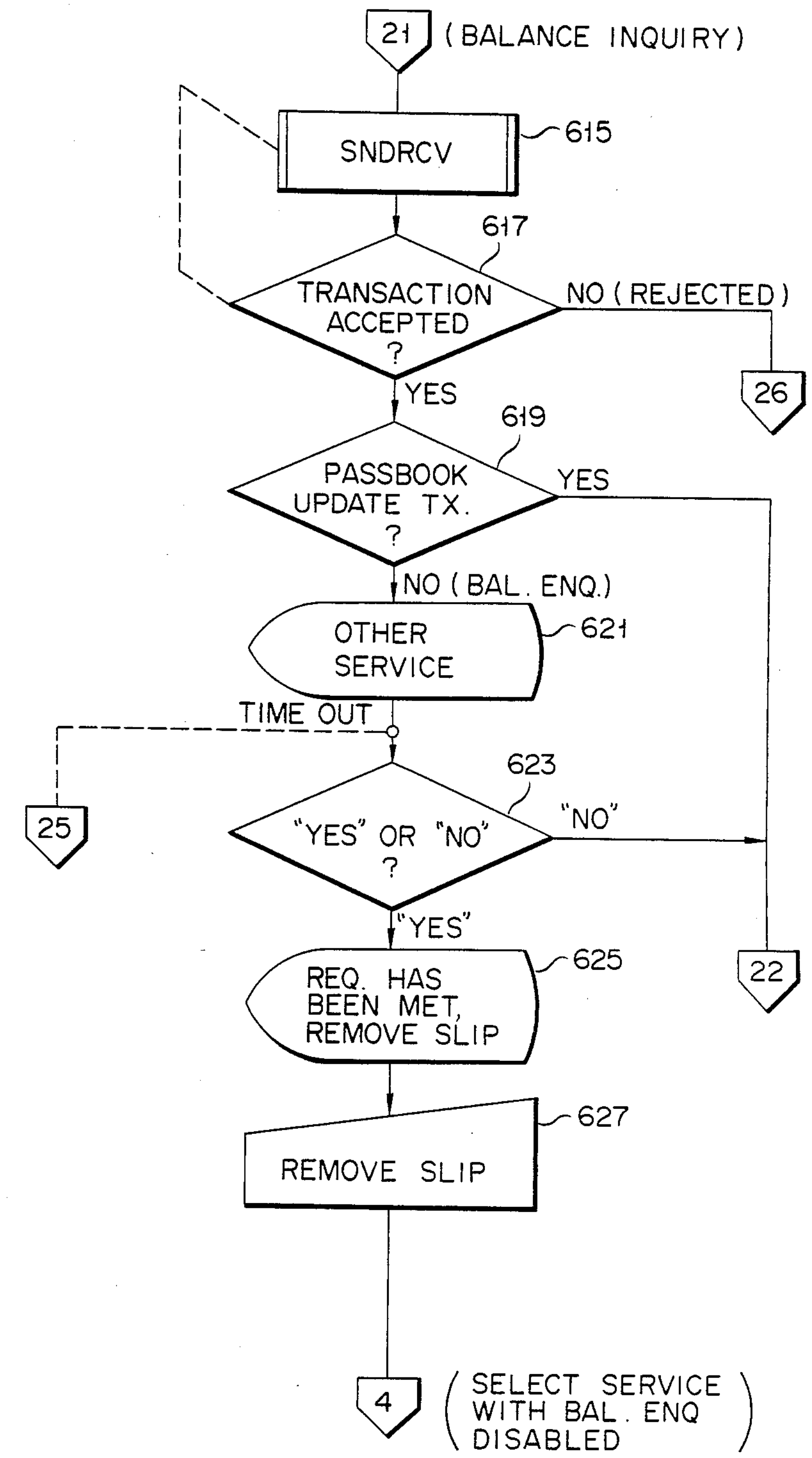
Figures 15, 16:
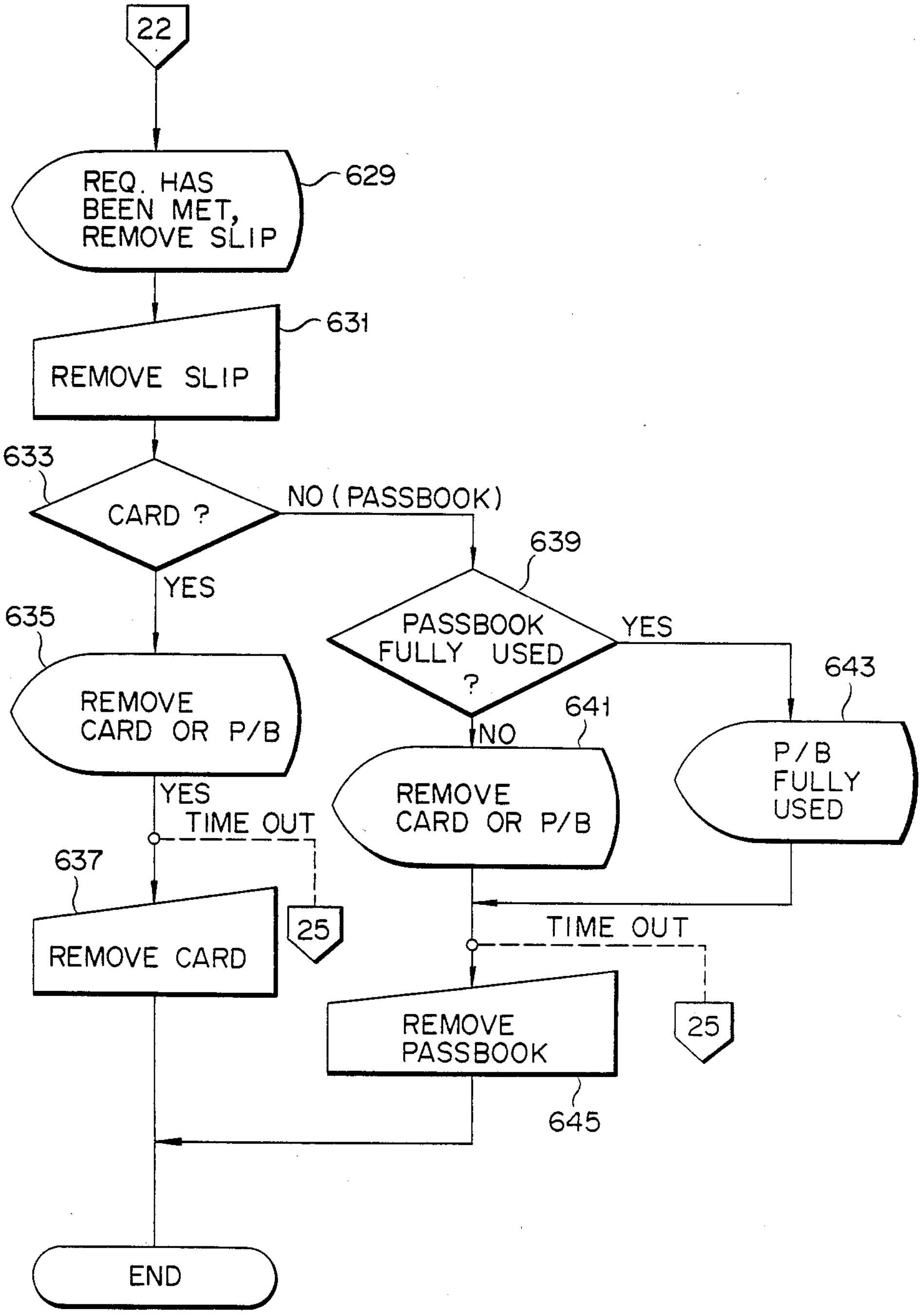
Figures 15, 16, 17:
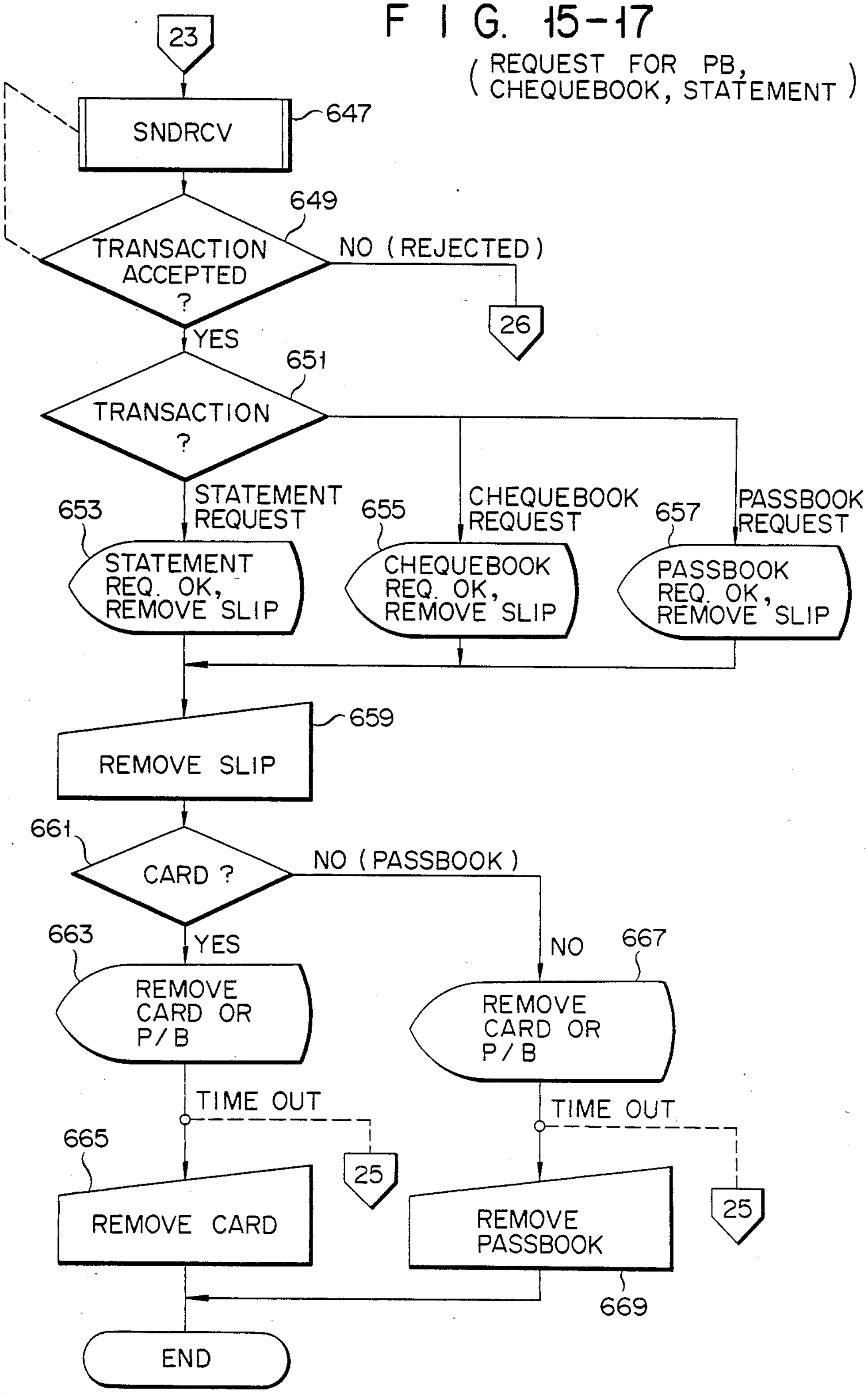
Figures 15, 16, 17, 18:
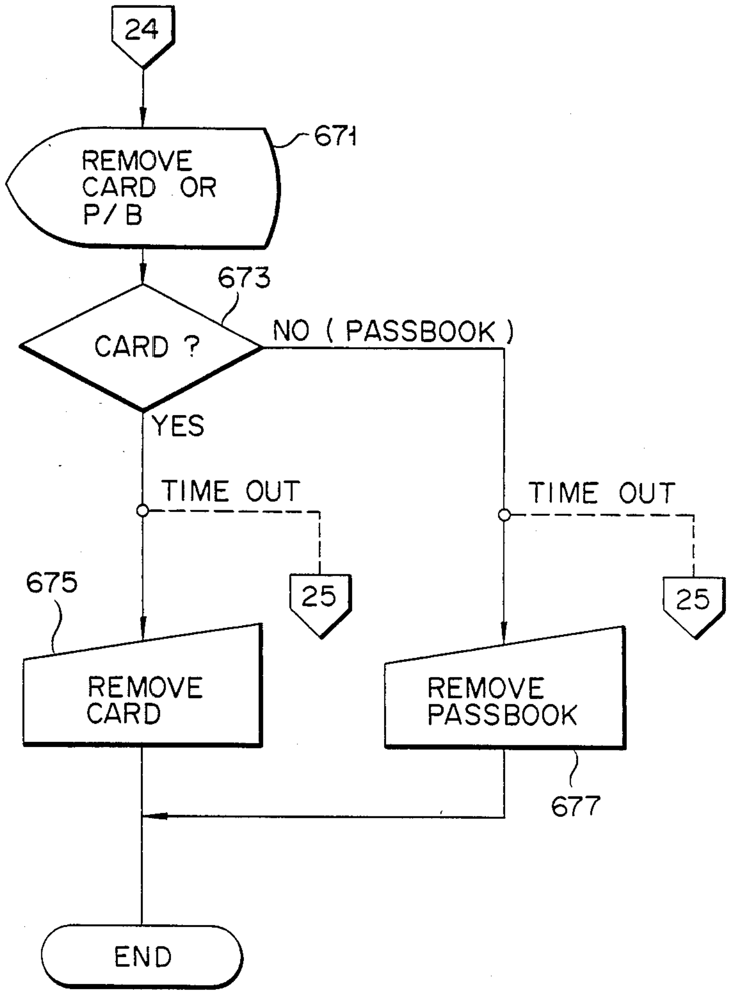
Figures 15, 16, 17, 18, 19:
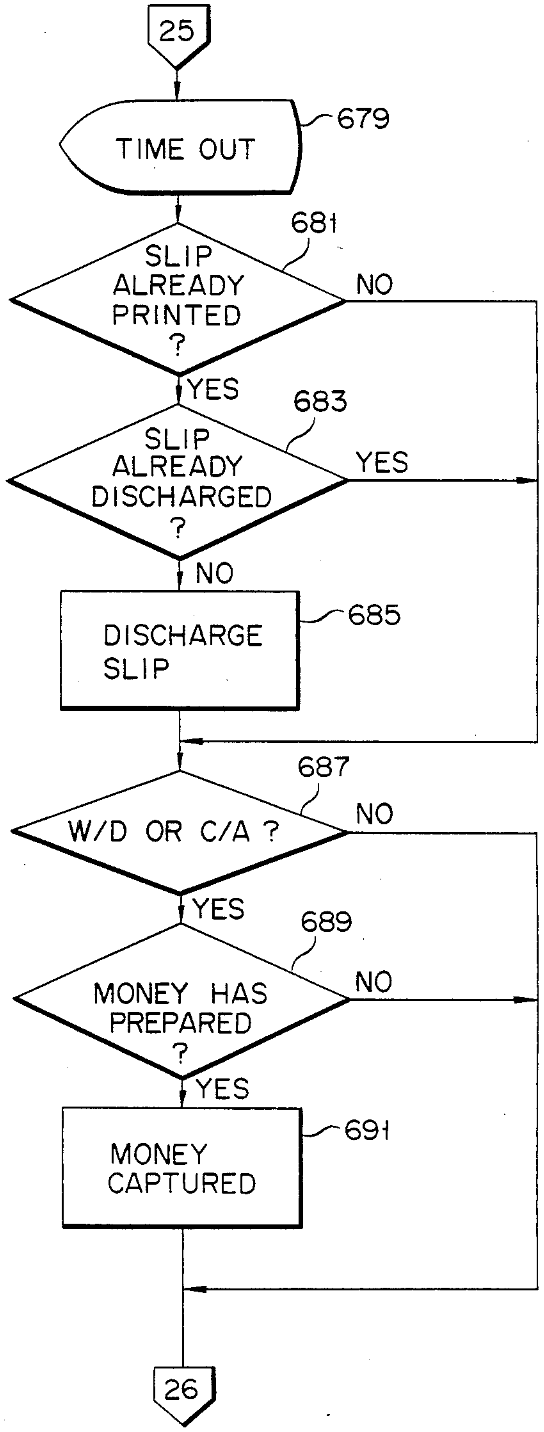
Figures 15, 16, 17, 18, 19, 20:
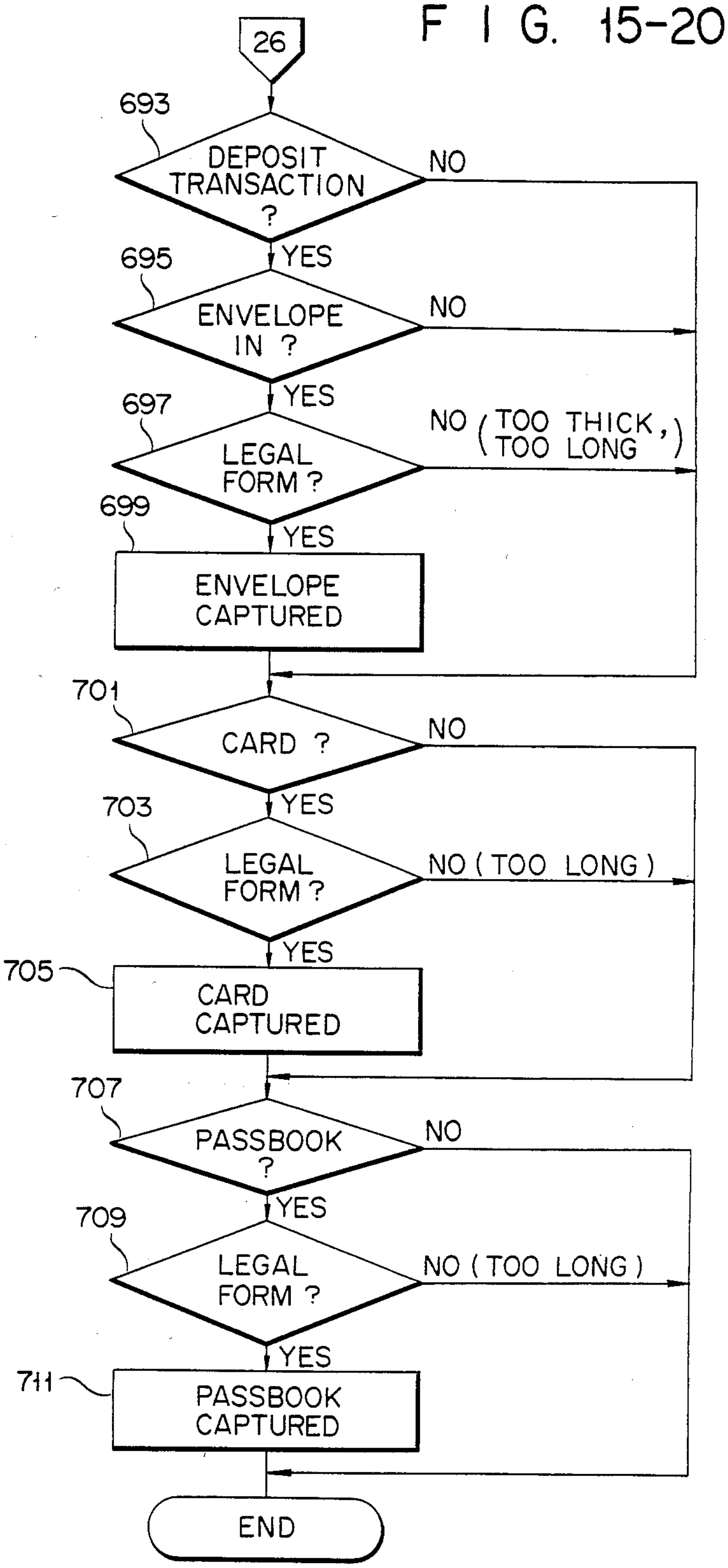
Figures 15, 16, 17, 18, 19, 20, 21:
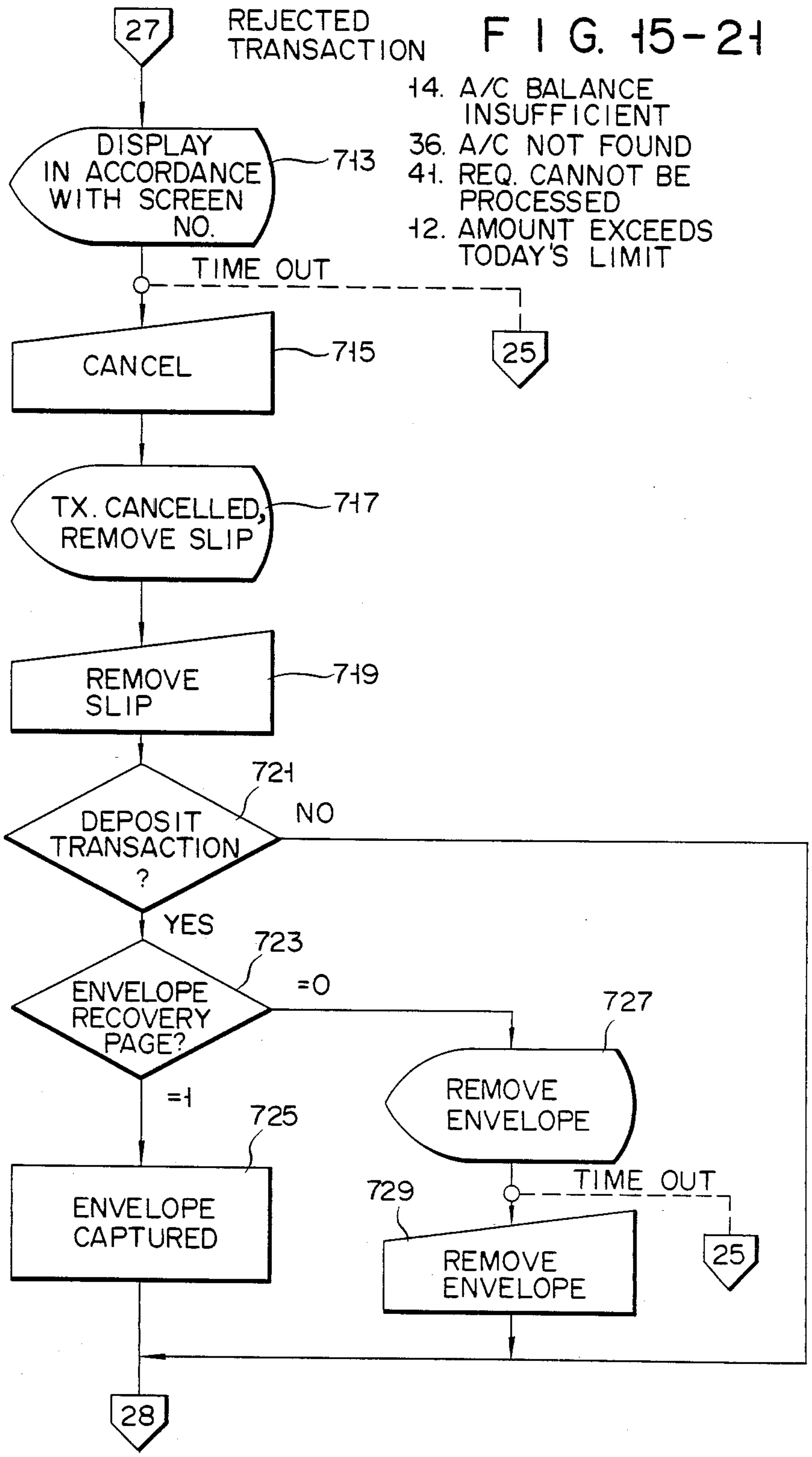
Figures 15, 16, 17, 18, 19, 20, 21, 22:
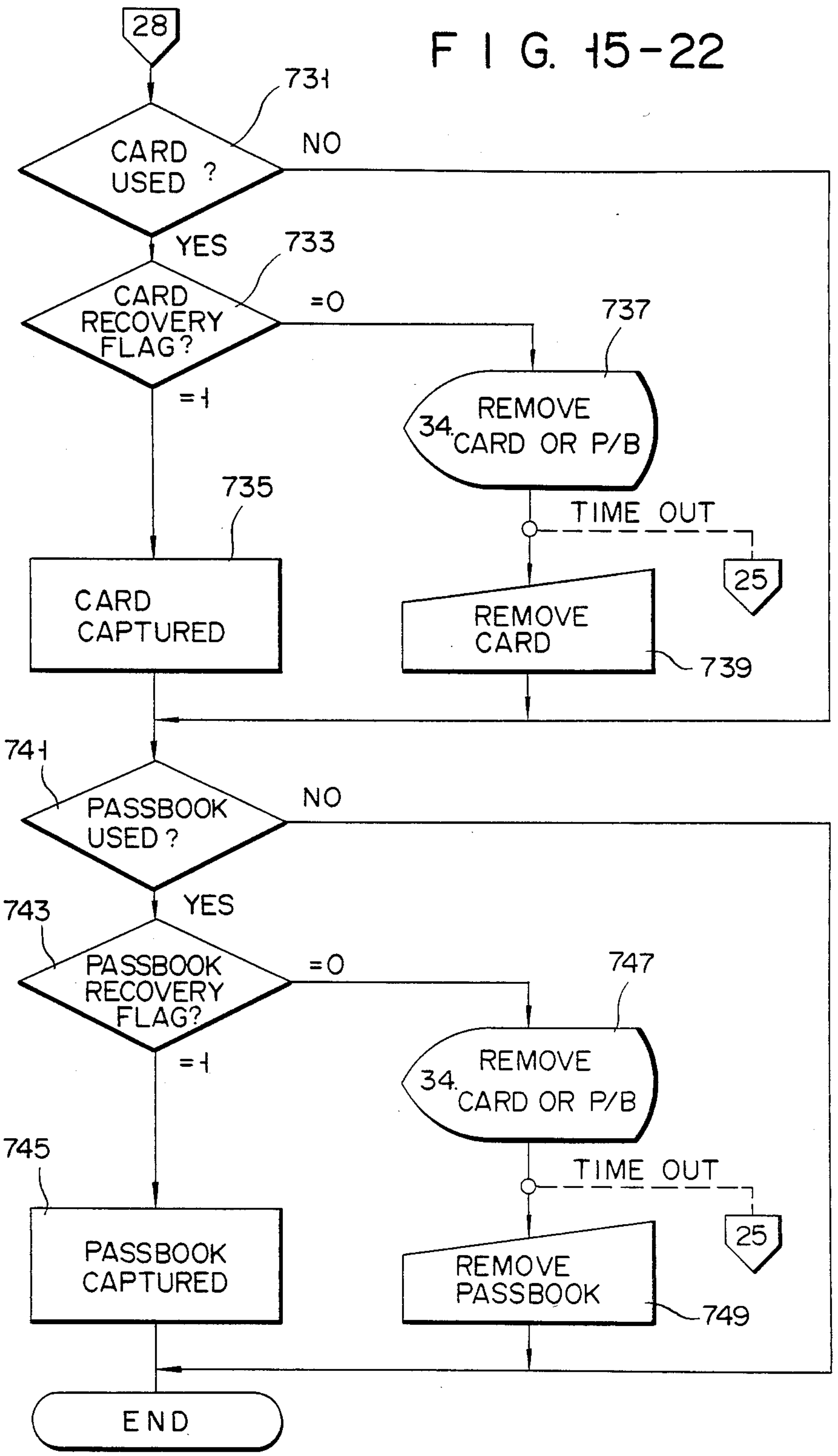
Figures 15, 16, 17, 18, 19, 20, 21, 22, 23:
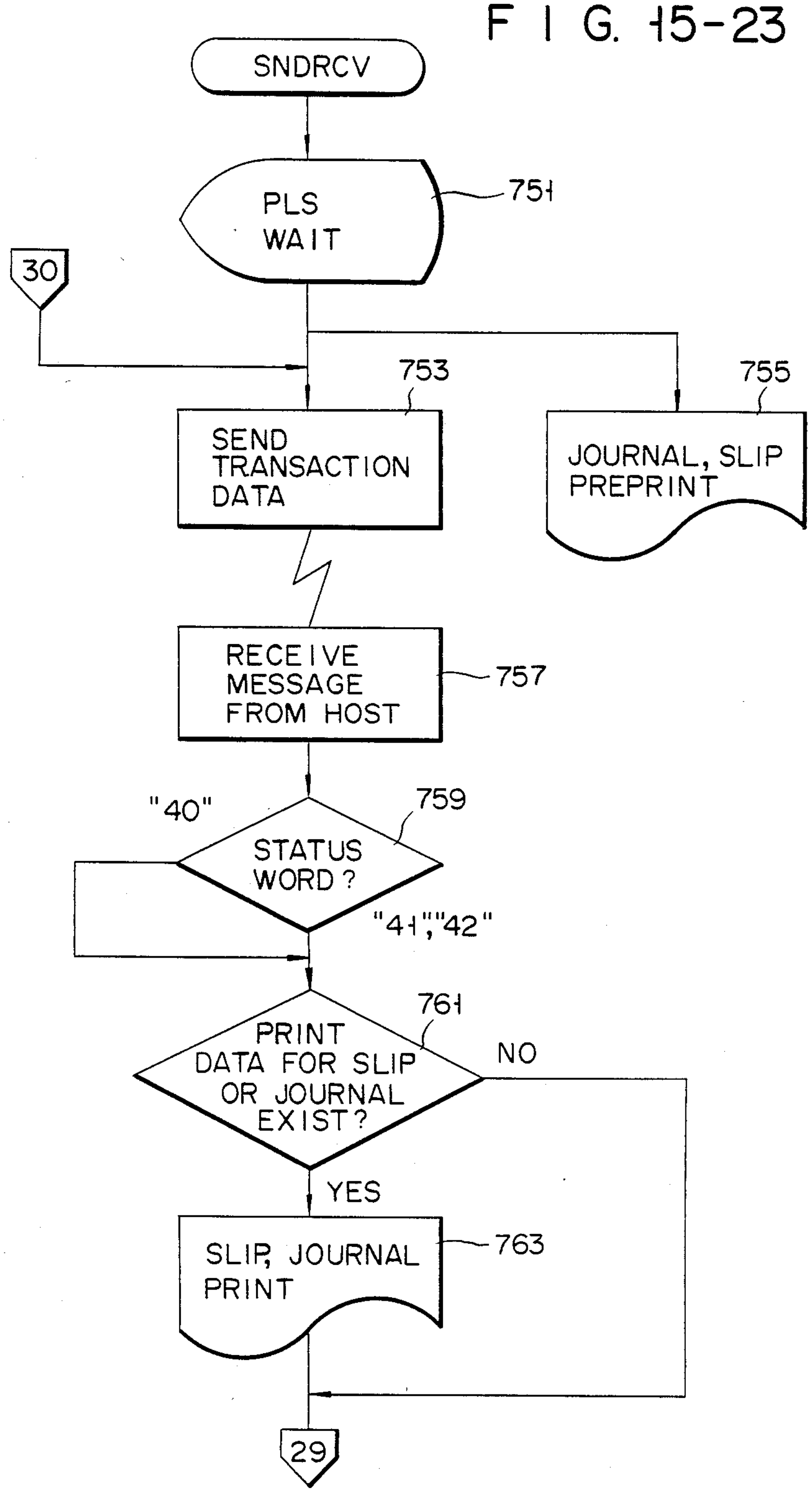
Figures 15, 16, 17, 18, 19, 20, 21, 22, 23, 24:
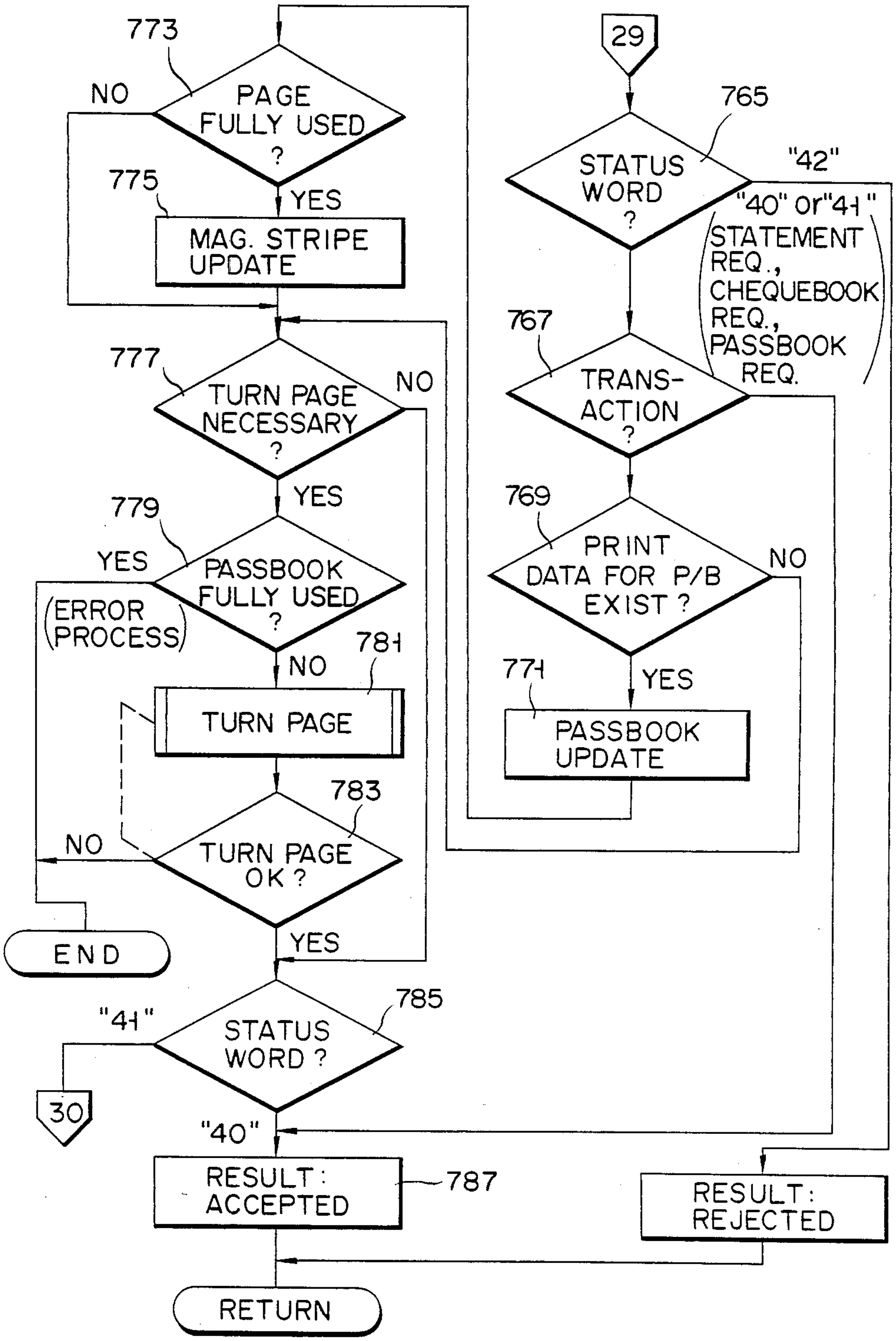
Figures 15, 16, 17, 18, 19, 20, 21, 22, 23, 24, 25:
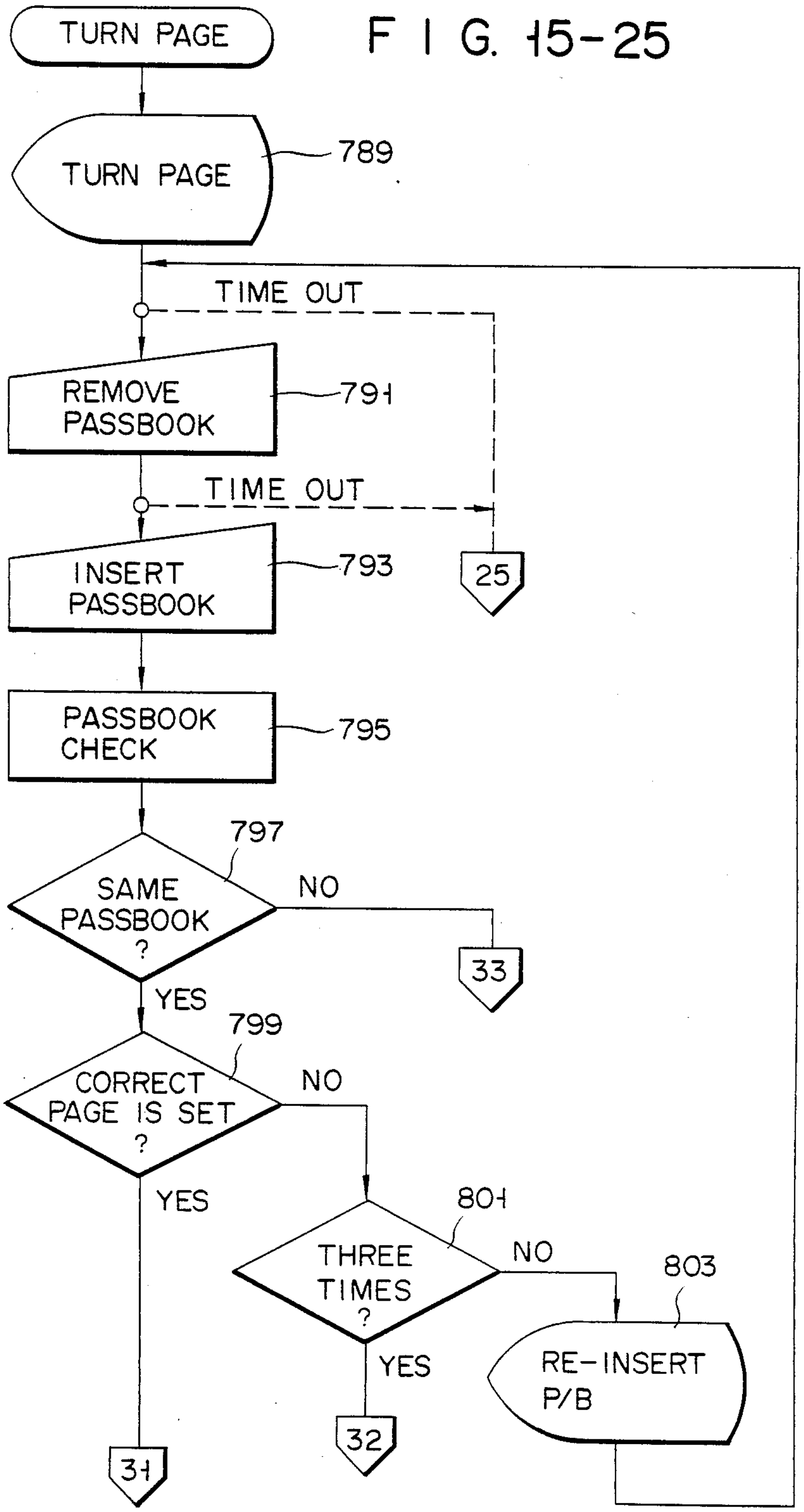
Figures 15, 16, 17, 18, 19, 20, 21, 22, 23, 24, 25, 26:
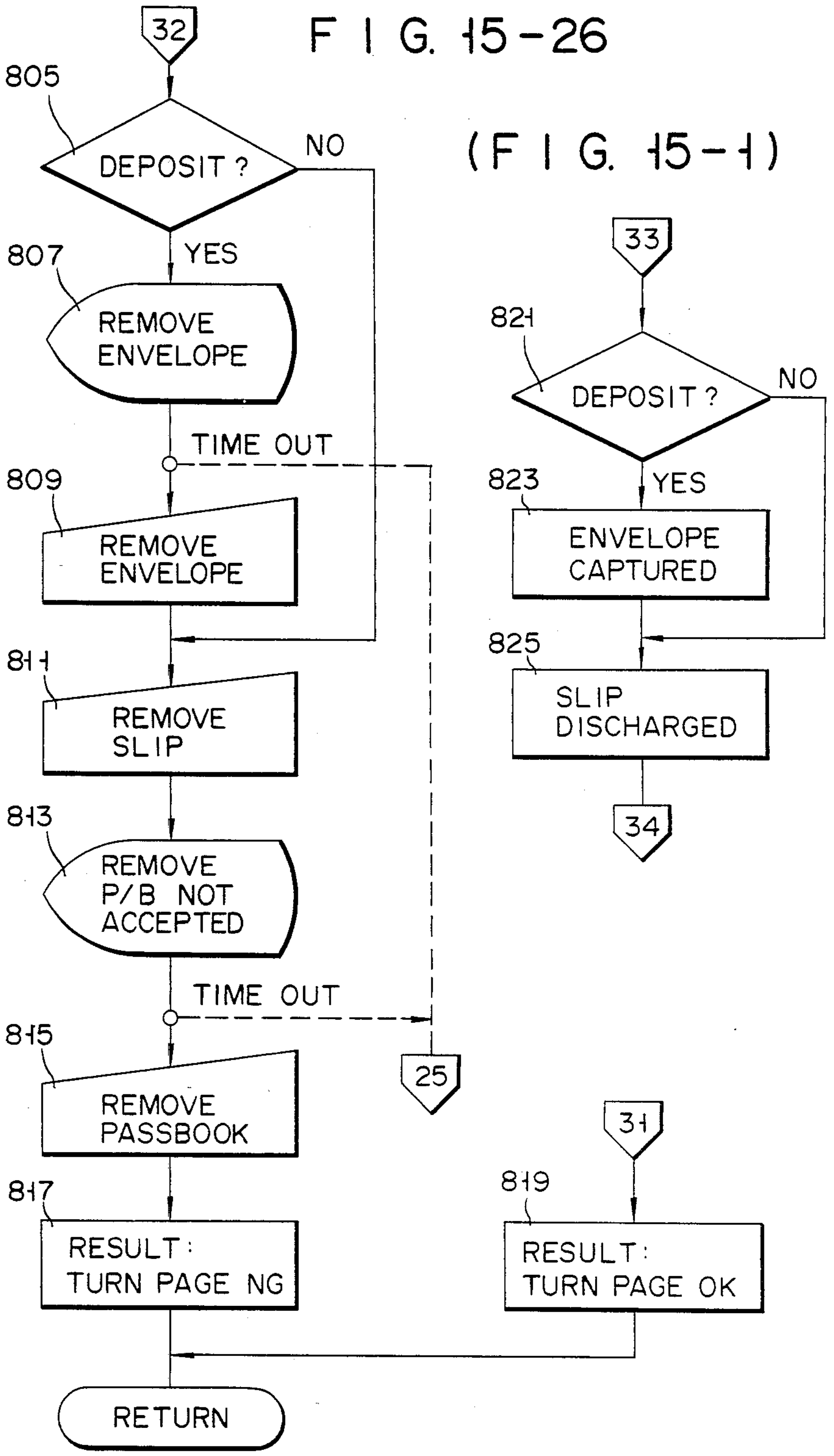
Figures 15, 16, 17, 18, 19, 20, 21, 22, 23, 24, 25, 26, 27:
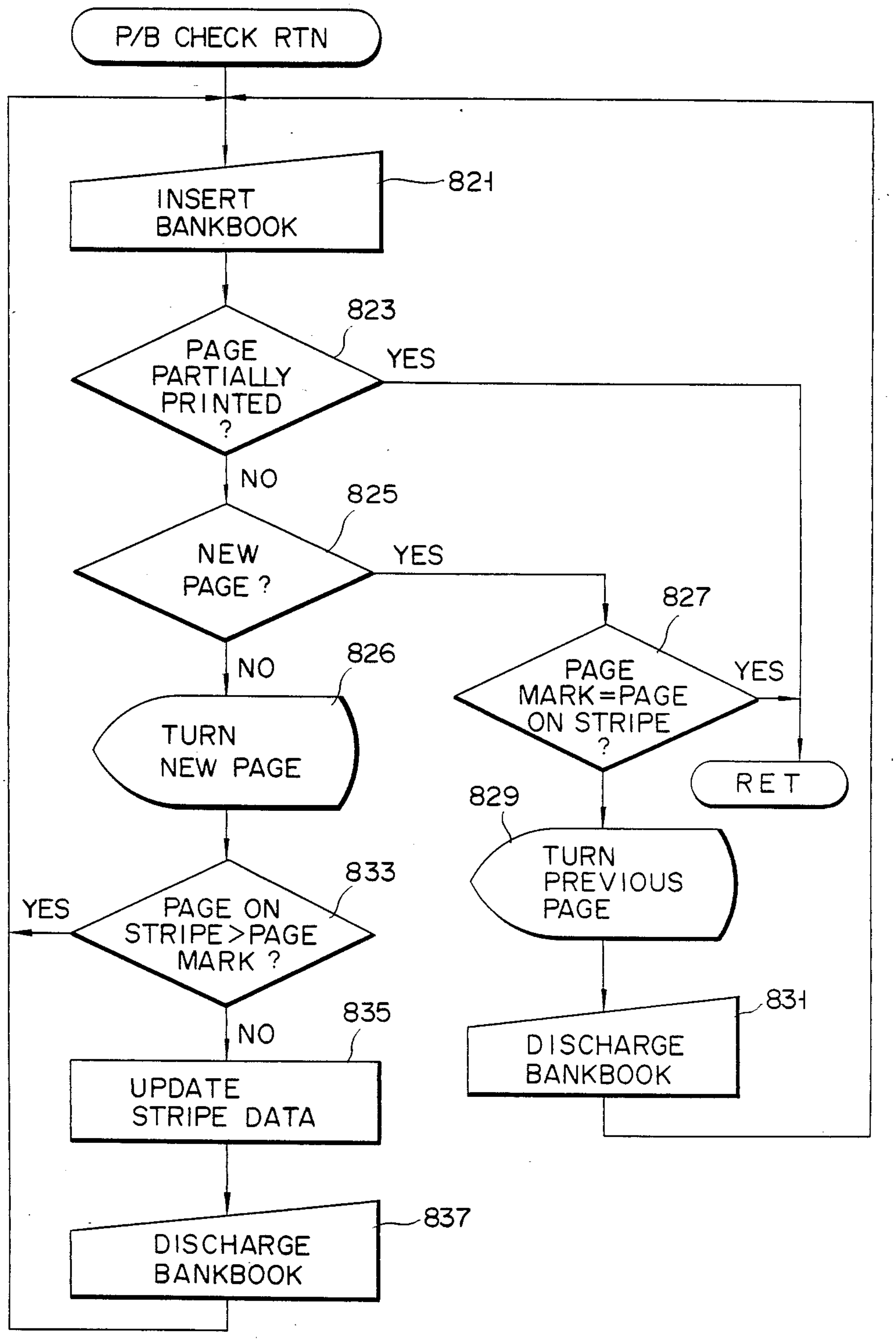
Figure 16:
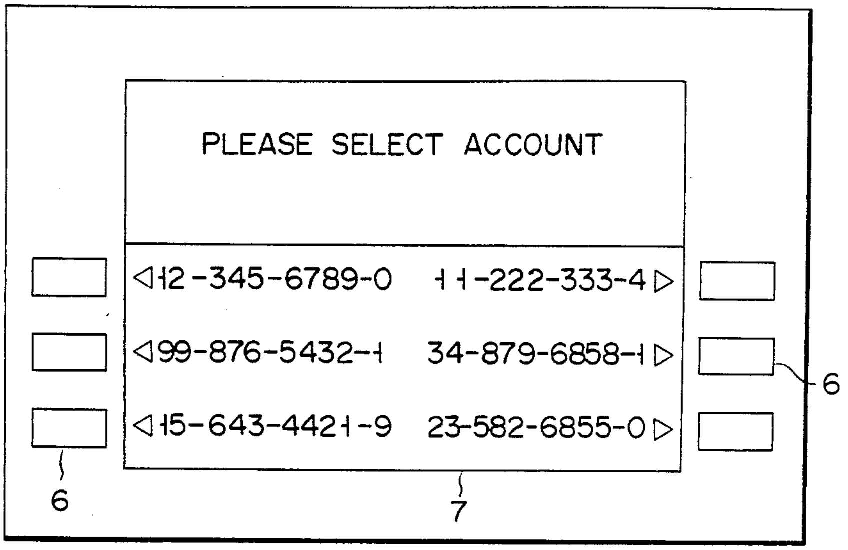
Figure 17:
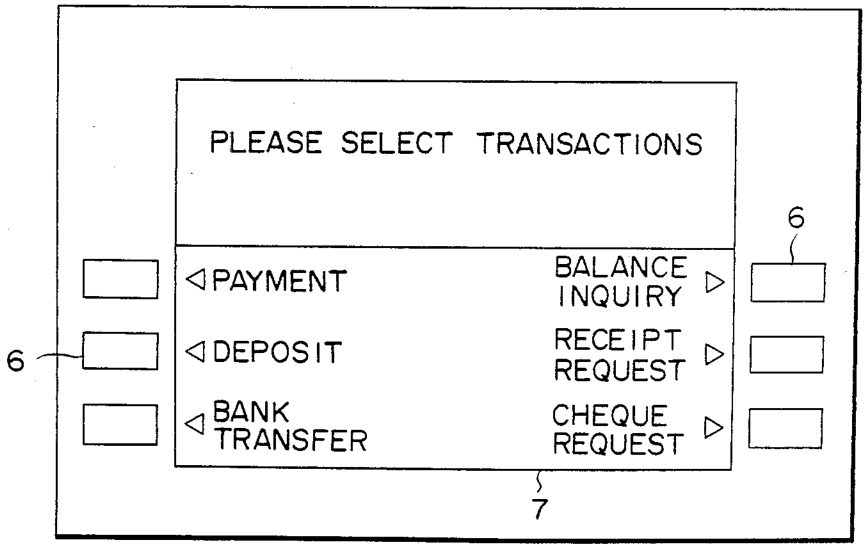

In the flow chart shown in FIG. 15-6, when the key of the keyboard 6 which corresponds to "payment" is depressed, the main control section 201 checks if a card is inserted (step 403). When the main control section 201 determines that a card is inserted, the account status is checked in accordance with the status signal in the message (step 405). When the status signal indicates the account is invalid for payment, the main control section 201 causes the CRT display 7 to display the message "Payment From A/C Not Allowed" (step 427) or "C/A Not Allowed" (step 435). When no operation is made by the customer within a predetermined time interval, the card is returned to the customer. However, when the customer depresses the cancel button in response to the display (step 429), the main control section 201 causes the CRT display 7 to display the guide message "Remove Card or P/B" (step 431). The card is discharged to the card insertion port 13. When card removal (step 433) is performed by the corresponding customer, the automatic teller machine is immediately set in the standby mode to await the next customer. However, when the card is not removed within a predetermined time interval, the card is captured by the machine. When the payment allowable account of which payment is definite, the control is advanced to the send-/receive step (step 441). When the payment allowable account is any account other than a credit account, when the passbook is inserted, the main control section 201 causes the CRT display 7 to display the message "Enter Amount" (step 407). When no operation is performed within a predetermined time interval, the card or passbook is retained by the machine.

When the customer keys in the amount to be withdrawn at the keyboard 6 (step 409), the main control section checks that the specified amount does not exceed the limit (step 411). If YES in step 411, the main control section 210 causes the CRT display 7 to display the message "Amount Exceeds Limit" (and "Key in another amount") (step 413). However, if NO in step 411, the main control section 201 checks if $10 bills are left in the safe (step 415). If NO in step 415, the main control section 210 checks if the amount is to be withdrawn in units of $100 bills (step 417). When NO, the main control section 210 causes the CRT display 7 to display the guide message "Only $100 Units" (step 419). However, if YES in step 415, the main control section 201 checks if the appropriate amount can be withdrawn in units of $10 bills (step 423). The main control section 201 then checks in step 423 if a total amount is correct. If NO in step 423, the main control section 210 causes the CRT display 7 to display the guide message "Not In Units of $10" (step 425). When the main control section 201 determines that the customer then depresses the cancel button in accordance with the corresponding guide message (step 421), the card or passbook is discharged. Thereafter, when another amount is keyed in at the keyboard 6 (step 409), the above flow is repeated.

However, if YES in step 423 or 417, that is, the total amount is payable, the main control section 201 causes the CRT display 7 to display the guide message "Check & Confirm (W/D, C/A)" (step 437). If no operation is performed within a predetermined time interval, the card is captured by the machine in a manner to be described later. When the cancel button is depressed (step 439), the card discharge operation is performed. When the customer depresses a confirmation button or wishes to effect a transaction against a credit account of a definite amount, the main control section 201 communicates with the host computer 223 (step 441).

Since the upper limit of a cash withdrawal by credit card is given as a fixed amount (e.g., $500) registered in the transaction data file 224 in the CPU 221, the amount entry and confirmation step are skipped to simplify the operations required of the customer.

The communication between the automatic teller machine and the host computer 223 is performed, as shown in FIG. 15-23. The main control section 201 causes the CRT display 7 to display the guide message "Pls (please) Wait" (step 751) and sends the transaction data to the host computer 223 (step 753). The main control section 201 causes the print controller 203 to receive signals indicating preliminary print data (content of the magnetic stripe, the amount and the transaction content) to be printed on the journal paper roll 139 and slip. As a result, the print controller 203 reads out from the memory 204 the character patterns corresponding to the signals from the main control section 201. The display pattern is supplied from the print controller 203 to the drivers 206 and 207. The driver 206 causes the printer 135 in the passbook reader/printer 23 to print the data on the journal paper roll 139, and the driver 207 causes the receipt (slip) issuing unit 25 to print the data on a slip (step 755). Thereafter, the transaction data and a message are transmitted from the host computer 223 to the main control section 201 (step 757). As a result, the main control section 201 decodes the message (e.g., completed transaction ("40"), half-completed transaction ("41"), no transaction ("42")) (step 759). The main control section 201 determines in step 761 whether or not the print data for the slip is included in the message. If YES in step 761, the print data is supplied to the print controller 203. The print controller 203 causes the driver 207 to print the print data on the slip (step 763).

When the P/B print data is included in the message, the main control section 201 causes the printer 135 in the passbook or bankbook reader/printer 23 to print the data.

The main control section 201 determines whether the opened page of the passbook inserted in the machine is fully used (step 773). If YES in step 773, the data recorded on the magnetic stripe is updated (step 775). Furthermore, the main control section 201 checks if the data exists to be printed on the page and therefore the page is to be turned (step 777). If YES in step 777, the main control section 201 determines whether or not the passbook is fully used (step 779). If NO in step 779, the page is turned (step 781).

When the print data is printed up to the final line of a given page and part thereof still remains unprinted, the main control section 201 causes the magnetic head 147 to update the page of the passbook to the next page and causes the CRT display 7 to display the guide message "Turn Page" (step 789). The passbook is discharged from the passbook insertion port 11. Thereafter, if no operation is made by the customer within a predetermined time interval, the passbook is retained by the machine.

When the customer turns the page of the passbook and inserts the passbook (steps 793 and 795) in accordance with the guide message described above, the main control section 201 checks if the inserted passbook is the immediately preceding passbook dispensed in accordance with the instruction (step 797). If NO in step 797, and if a deposit is made in step 821, the deposit envelope is retained in step 823 and the slip is discharged (step 825). However, if NO in step 821, only the slip is discharged (step 825). When the slip is already printed at the time of discharge of the slip, a word "cancel" is printed in the line next to the last data printed on the slip. The customer and bank personnel thereby know that this slip is invalid, thereby avoiding unnecessary problems.

When YES in step 797 (i.e., when the main control section 201 determines that the same passbook is inserted) and the main control section 201 determines that this passbook is inserted such that the page data written on the magnetic stripe coincides with that represented by the page mark (step 799), the main control section 201 determines that the page is properly turned. However, when the main control section 201 determines that the inserted passbook is not open at the set page, the main control section 201 causes the CRT display 7 to display "Re-insert P/B". This may be repeated up to three times, with the flow being restarted from step 791 three times. However, when the inserted passbook is not open at the correct page on three occasions in succession, the main control section 201 checks whether or not a deposit is made (step 805). If YES in step 805, the guide message "Remove Envelope" is displayed at the CRT display 7. In this case, after main control section 201 determines that the customer has removed the envelope in accordance with the guide message (step 809) or that he has made a transaction other than a deposit, the main control section 201 discharges the slip from the receipt dispensing port 10. When the customer removes the slip (step 811), the main control section 201 causes the CRT display 7 to display the message "Remove P/B-Not Accepted" (step 813). If no further operation is made by the customer within a predetermined time interval, the passbook is captured by the machine. When the customer removes the passbook (step 815), the main control section 201 determines that the page is not turned (step 817).

When the main control section 201 determines that the page is correctly turned (step 785) and the processing for the final message is completed or that the customer has selected the passbook request, the check request or the receipt request (step 767), the main control section 201 determines that transmission/reception is properly ended. As a result, the main control section 201 determines that the transaction is accepted (step 443 in FIG. 15-7), and the bill dispensing signal is supplied to the bill dispensing mechanism 22. The bill dispensing mechanism 22 dispenses bills P from the first and second safes 53 and 54. The dispensed bills P are stacked in the temporary stacking section 91.

The bills dispensed from the first and second safes 53 and 54 through the dispensing mechanisms 55 are detected by the bill detectors 58 and 59 arranged along the first and second conveyance paths 57*a* and 57*b*, respectively. A counter (not shown) in the main control section 201 counts up the detected signals. The bills are discriminated by the bill detector 60 arranged in the common conveyance path 57*c* and are conveyed from the second bill transfer portions 70 to the second unit 52.

The bills P sequentially transferred to the second unit 52 are further transferred to the conveyance path 77 through the bill reception port 75. When the leading ends of the bills P are detected by the bill detector 79, and if they do not overlie and are regarded as proper bills P, the first sorting gate 78 lies to the left, and the bills P are conveyed to the proper bill conveyance path 80. The bills are sequentially stacked in the temporary stacking section 91 through the impellers 90, and abut against the end faces of the separation stoppers 92. The bills are then separated from the impellers 90 and drop to be brought together on the conveyor belts 93 which travel in a direction away from the bill dispensing port 11. Thus, the ends of the bills are aligned with each other, and the bills are stacked in a tidy, aligned manner.

When bills corresponding to the specified withdrawal amount are dispensed from the safes 53 and 54 and are stacked, if they do not overlie and are regarded as proper bills, and if the count of the counter of the main control section 201 coincides with the specified withdrawal amount, the conveyor belts of the bill dispensing system are temporarily stopped. The rotation of the impellers 90 is also stopped simultaneously when the above-mentioned conveyor belts are stopped.

When all the bills to be paid out are stacked in the temporary stacking section 91, the main control section 201 simultaneously causes the CRT display 7 to display the guide message "Remove Slip" (step 449). The customer removes the slip in accordance with the guide message (step 449). Upon removal of the slip, the main control section 201 checks if the transaction is made using a card (step 451). If YES in step 451, the main control section 201 causes the CRT display 7 to display the guide message "Remove Card" (step 453). The customer then removes his card in accordance with this guide message (step 455). When the customer does not remove the card within a predetermined time interval, the card is retained by the machine in a manner to be described later. However, when the transaction is made using a passbook, the main control section 201 determines whether the passbook is fully used (step 467). If NO in step 467, the main control section 201 causes the CRT display 7 to display the guide message "Remove P/B" (step 469). However, if YES in step 467, the main control section 201 causes the CRT display 7 to display the guide message "P/B Fully Used. Please take the P/B and come to the counter" (step 471). The customer then removes the passbook in accordance with this guide message (step 473). When the customer does not remove the passbook within a predetermined time interval, the passbook is retained by the machine.

Upon removal of the card or passbook, the main control section 201 causes the CRT display 7 to display the guide message "Remove Money" (step 457) and supplies the bill dispensing signal to the bill dispensing mechanism 22. The bill dispensing mechanism 22 urges the bills stacked in the temporary stacking section 91 against the bill dispensing/retain conveyor belts 93 upon pivotal movement of the separation stoppers 92, so that the bills P stacked in the temporary stacking section 91 are simultaneously transferred. The conveyor belts 93 travel in the dispensing direction, so that the bills P are conveyed toward the bill dispensing port 11. When the leading ends of the bills P are detected by the bill detector 105, the shutter 104 is opened upon energization of the solenoid 103. When the trailing ends of the bills are detected by the bill detector 102, the conveying operation is stopped, so that the bills P are dispensed to the customer such that the leading ends of the bills P extend from the bill dispensing port 11 and the trailing ends thereof are clamped between the pinch roller 100 and the pair of conveyor belts 93 (step 459). Thereafter, the main control section 201 performs an accumulation operation of the transaction data (i.e., the main control section 201 counts up a total number of transactions and a total amount) (step 461). When the customer has removed the bills (step 463), the main control section 201 completes the operation and awaits the next customer. When the customer does not remove the bills or money within a predetermined time interval, the main control section 201 causes the machine to recover or retain the bills or money (steps 465).

When the card or passbook is discharged and the customer does not remove it within a predetermined time interval (i.e., when the customer forgets to remove the card or passbook which is thus left at the dispensing port), the main control section 201 supplies a retain signal to the card reader 21 or the passbook reader/-printer 23, the print controller 203 and the dispensing mechanism 22. The card reader 21 or the passbook reader/printer 23 fetches the card or passbook into the machine, so that the card or passbook is retained into a recovery compartment. The print controller 203 causes the drivers 206 and 207 to print the word "cancel" on the passbook, the slip and the journal paper. The bill dispensing mechanism 22 retains the bills P stacked in the temporary stacking section 91 or the rejected bill container 110. In this manner, the different types of transaction media are dispensed with so that the next transaction can be performed. Although the transaction data stored in the transaction data file 224 in the CPU 221 is updated, in practice, the bills are not dispensed to the customer. The main control section 201 then sends to the host computer 223 a message indicating cancellation of the immediately previous transaction. The host computer 223 then restores the immediately previous status of the customer's transaction data stored in the transaction data file 224.

When bills dispensed at the bill dispensing port 11 are not removed by the customer within a predetermined time interval, the main control section 201 supplies the retain signal to the bill dispensing mechanism 22. The bill dispensing mechanism 22 retains, the bills dispensed at the bill dispensing port 11 and the bill recovery container 101. In this case, some of the bills P may be removed by the customer. In this case, since the customer may have removed some of the bills P, it is not assured that all of the bills P have been retained in the bill recovery container 101. Therefore, the main control section 201 does not send the cancel message to the host computer 223, and awaits the next customer. The retain operation of the passbook, the card and the bills are performed in steps 679 through 711 shown in FIGS. 15–19 and 15–20.

The main control section 201 checks if the transaction is accepted (step 443 in FIG. 15–7). When the main control section 201 determines that the transaction is rejected, the main control section 201 causes the CRT display 7 to display the appropriate message indicating that the selected account cannot be found, the inserted card is a stolen card, or that the request cannot be allowed, and at the same time to display a message indicating that the customer should depress the cancel button (step 713 in FIG. 15–21). Thereafter, when the customer does not depress the cancel button within a predetermined time interval, the card or passbook is retained. However, when the customer depresses the cancel button in accordance with the guide message (step 715), the main control section 201 causes the CRT display 7 to display the guide message "Transaction is invalid. Remove Slip" (step 717). At the same time, the slip is discharged from the receipt dispensing port 10. The above guide message is displayed for a predetermined period of time without any condition. Even if the customer removes the slip without reading the guide message at the CRT display 7, the customer can read this message within the predetermined period of time. Even if the customer forgets to remove the slip, he cannot immediately advance to the next transaction step since the above-mentioned message is displayed for the predetermined period of time. Thereafter, the main control section 201 checks the envelope retain flag, the passbook retain flag and the card retain flag and retains the envelope, the passbook or card in the corresponding container or returns it to the customer in accordance with the logic state of the corresponding flag. The above operation is shown in steps 721 in FIG. 15–21 to 749 in FIG. 15–22.

When the customer depresses a key corresponding to "deposit" (i.e., deposit with an envelope) at the time of item selection, the main control section 201 checks if a card is inserted (step 475 in FIG. 15–9). If YES in step 475, the main control section 201 checks the account status in accordance with the status signal of the message (step 477). When the status signal indicates a credit account, which does not allow a "deposit", the main control section 201 causes the CRT display 7 to display a guide message "C/C Not Allowed" (and "Depress the cancel button") (step 481). When a card of another bank is inserted, the main control section 201 causes the CRT display to display the guide message "Interbank Not Allowed" (and "Depress the cancel button") (step 485). If no operation is made by the customer within a predetermined time interval, the card is retained. However, when the customer depresses the cancel button in accordance with the guide message (step 483), the main control section 201 discharges the card. On the other hand, when the account allows a deposit or when the passbook is inserted, the main control section 201 causes the CRT display 7 to display the guide message "Enter Amount" (step 487). Thereafter, when a predetermined operation is not performed within a predetermined time interval, the card or passbook is retained.

When a deposit amount is keyed in at the keyboard 6 in accordance with the guide message (step 489), the main control section 201 causes the CRT display 7 to display the guide message "Check & Confirm" in step 491. Thereafter, if no operation is made by the customer within a predetermined time interval, the card or passbook is retained. However, if the customer depresses the cancel button in accordance with the guide message, the main control section 201 discharges the card or passbook. If the customer depresses the confirmation button, the main control section 201 supplies to the print controller 203 the amount data entered together with the account number data and the machine number data. These data are then printed on the slip (step 495). The printed slip is dispensed from the slip dispensing port 10 (step 499). Upon dispensing of the slip, the main control section 201 causes the CRT display 7 to display the guide message "Insert Envelope" (Take out an envelope, insert the slip and cash (a check or note), close the envelope and insert the envelope) (step 501 in FIG. 15–10). At the same time, the main control section 201 supplies a lock release signal to the envelope processing unit 24. The envelope processing unit 24 energizes the solenoid 159 to move the coupling lever 161 downward, so that the locking arm 155 pivots about the projection **163*a* in the direction indicated by arrow d. The locking arm 155 is then disengaged from the locking pawl 158*a*, so that the lock for stopping dispensing of the envelopes is released. If no operation is performed within a predetermined time interval after the above guide message is displayed, the card or passbook is retained. When the customer pulls the handle 8 in accordance with the guide message, an envelope is dispensed by the envelope dispensing plate 158 through the opening 154. The customer inserts the slip and a check, a note or cash. The envelope is then inserted at the envelope insertion port 9 (step 503). The main control section 201 receives the detection signal from the envelope detector 170 and deenergizes the solenoid 159. The coupling lever 161 is then moved upward to the initial position. Upon movement of the coupling lever 161, the locking arm 155 is pivoted in the direction indicated by arrow c, so that the locking arm 155 becomes engaged with the locking pawl 158*a*. As a result, the customer cannot pull the handle 8 any longer and cannot take out an envelope. When the inserted envelope is detected by the envelope detector 171, the motor 176 is stopped. The thickness detector 200 generates a detection signal at the time of envelope insertion, and the main control section 201 determines whether the envelope has a thickness greater than a predetermined value (step 505). If YES in step 505, the main control section 201 causes the CRT display 7 to display the guide message "Deposit Too Bulky" ("Depress cancel button and retry transaction") (step 507**). When the customer does not depress the cancel button within a predetermined time interval, the card or passbook is retained by the machine. However, when the customer depresses the cancel button within the predetermined time interval, the card or passbook is properly returned to the customer.

When the main control section 201 determines that the envelope has a legal form (YES in step 505), the main control section 201 communicates with the host computer 223 (step 511 in FIG. 15-11). The communication operation is substantially the same as for the payment processing as previously described, except that the communication operation further includes the envelope discharge processing (steps 805 through 809 in FIGS. 15-26) and the envelope retention processing (steps 821 through 823). Therefore, the main control section 201 causes the drivers to print data on the journal paper, the slip and the passbook in accordance with the message received from the host computer 223. In this case, unlike the payment transaction as previously described, the transaction data is not printed on the passbook, but only the nonprinted print data excluding the current transaction data are printed thereon. Since the customer makes the deposit in an envelope, the main control section 201 cannot determine that the contents of the envelope coincide with the amount data entered by the customer. Therefore, the transaction data will not be written in the transaction data file 224 by the host computer. As a result, this transaction will not be recorded in the passbook.

When communication between the main control section 201 and the host computer 223 is completed, the main control section 201 checks if the above transaction is accepted in accordance with the transaction status signal (step 513 in FIG. 15-11). However, if the main control section 201 determines that the transaction is not accepted (rejected), then the same reject processing as in the payment processing is performed. The envelope is returned or retained in accordance with whether the envelope capture flag is set at logic "1" or "0" (steps 723 through 729 in FIG. 15-21). However, when the main control section 201 determines that the transaction is accepted, the main control section 201 supplies an envelope print and storage signal to the envelope processing unit 24. The envelope processing unit 24 stamps the envelope by means of the printer 168 in the envelope processing unit 24. The envelope is then stored in the hopper 169.

The main control section 201 causes the CRT display 7 to display the guide message"REQ. Has Been Met. Remove Slip" (step 519 in FIG. 15-11). The customer removes the slip in accordance with this guide message (step 521). Upon removal of the slip, the main control section 201 checks if the transaction was made using a card (step 523). If YES in step 589, the main control section 201 causes the CRT display 7 to display the guide message "Remove Card" (step 525). The customer then removes the card in accordance with the guide message (step 527). However, if the customer does not remove the card within a predetermined time interval, the card is retained by the machine. However, if a passbook was used, the main control section 201 determines whether or not the passbook is fully used. If NO in step 595, the main control section 201 causes the CRT display 7 to display the guide message "Remove P/B" (step 531). When the P/B is fully used, the guide message "P/B is fully used. Please fetch P/B and come to the counter" at the CRT display 7 (Step 533). The customer then removes the passbook in accordance with this guide message (step 535). In this case, if the customer does not remove the passbook within a predetermined period of time, the passbook is retained by the machine. When the guide message for removing the slip is displayed, the main control section 201 does not check if the slip is removed by the customer. When a predetermined time interval has elapsed, the main control section 201 causes the CRT display 7 to display the guide message "Remove Card or P/B". Thereafter, the card or passbook is discharged. Unlike the payment transaction, the cancel message is not sent from the main control section 201 to the host computer 223 in the retention of the card or passbook. In other words, the transaction is completed and the deposit is accepted, so that the automatic teller machine matches with the host computer 223.

When the customer depresses a key of the keyboard 6 at the time of item selection which corresponds to a bank transfer, the main control section 201 checks if a card is inserted (step 537 in FIG. 15-12). If YES in step 537, the main control section 201 checks if the first selected account is a credit card (step 539). If NO in step 539, the main control section 201 detects the credit account number as a first account number (i.e., receiving account, that is, an account for debit. In other words, the main control section 201 checks the account status in accordance with the status signal of the message (step 541). The main control section 201 checks in step 543 if the bank transfer can be performed using this account. If it is determined in step 543 that the bank transfer cannot be performed, the main control section 201 causes the CRT display 7 to display the guide message "Transfer from the A/C Not Allowed" (step 545). When the customer does not depress the cancel button within a predetermined time interval after the above guide message is displayed, the card is retained by the machine. However, when the customer depresses the cancel button within the predetermined time interval (step 547), the card is dispensed or discharged to allow the customer to remove the card. However, if the main control section 201 determines that the bank transfer can be performed using the selected account (step 543), the main control section 201 causes the CRT display 7 to display the guide message "Select Receiving A/C" (step 551). At the same time, in step 551, the main control section 201 causes the CRT display 7 to display a message indicating keys for selecting one of the beneficiary accounts excluding the first account and credit card account of the account data obtained by the account inquiry described above, and also causes the CRT display 7 to display a message "Others". When the customer has a single account, the control is advanced to the beneficiary key-in steps (step 565). When no operation is performed by the customer within a predetermined time interval, the card is retained by the machine. However, when the customer selects a second account number (i.e., the receiving or beneficiary account) (step 553), the main control section 201 checks the account status (step 559). In this case, when the customer selects the C/C (credit card) account which is not allowed for a bank transfer, the main control section 201 causes the CRT display 7 to display the guide message "C/C Not Allowed" (step 561) and cancel the transaction processing (step 563).

When the main control section 201 determines that the transaction is made using a passbook (step 537), that a single A/C is obtained (YES in step 549), or that the customer has selected the item "others" (YES in step 557), the main control section 201 causes the CRT display 7 to display the guide message "Enter Beneficiary A/C" (step 565). When the customer enters the account number at the keyboard 6 in accordance with this guide message (step 567), the selected account number becomes the receiving account number or second account number. Thereafter, if the selected account number is valid, the main control section 201 causes the CRT display 7 to display the guide message "Enter Amount" (step 571). When the customer keys in the amount in response to this guide message (step 573), the main control section 201 causes the CRT display 7 to display the guide message "Check & Confirm (Transfer)" (step 577). However, when the customer checks and confirms the amount, if he realizes that he has entered an incorrect amount and depresses the cancel key, the main control section 201 is operated to discharge the card or passbook. If the customer depresses the confirmation button, the main control section 201 communicates with the host computer 223 (step 579). If no operation is made by the customer within a predetermined time interval upon display of the guide messages (steps 565, 571 and 575), the card or passbook is retained by the machine. After communication between the main control section 201 and the host computer 223 is completed, the same operation as in the payment transaction can be performed excluding the dispensing of bills.

When the main control section 201 determines that the first selected account number is the C/C account (step 539 in FIG. 15-12), the main control section 201 determines the first selected account number as the beneficiary account. The main control section 201 then checks if a plurality of A/Cs are present (step 603 in FIG. 15-12). If NO in step 603, the main control section 201 causes the CRT display 7 to display the guide message "Request Cannot Be Processed" (step 611). When the customer depresses the cancel button, the card is dispensed. However, when the main control section 201 determines that a plurality of A/Cs are present (step 603), the main control section 201 causes the CRT display 7 to display the guide message "Select A/C for Debit" and a message for indicating a debit account selection key (step 605). Thereafter, when no operation is made by the customer within a predetermined time interval, the card is retained. However, when the customer selects an account number (i.e., the debit account number) (step 607), the main control section 201 checks the account status (step 609). When the main control section 201 determines that an account which is not allowed for a debit transaction has been selected, the main control section 201 cancels the transaction (steps 545 and 547). If the account status is OK, the main control section 201 then causes the CRT display 7 to display the guide message "Enter Amount" (step 571). Thereafter, the same operation as for the bank transfer transaction is performed.

When the first account number is the credit card account number, the bank transfer is performed from the second account to the first account. However, when the first account number is an account excluding the credit card account, the bank transfer is performed from the first account to the second account. Therefore, when the customer wishes to request a bank transfer between his accounts, the customer need not enter the actual account numbers at the keyboard 6 but need only select two of the account numbers displayed at the CRT display 7, thereby simplifying the bank transfer transaction.

When the customer enters at the keyboard 6 data corresponding to the outstanding balance inquiry and bankbook or passbook print request at the time of item selection, the main control section 201 communicates with the host computer 223. The communication results are printed on the passbook, a slip and the journal. When the customer wishes to inquire as to the outstanding balance, the main control section 201 causes the CRT display 7 to display the outstanding balance data before the slip is dispensed, so that the customer can decide whether or not to continue with a subsequent transaction. If the customer selects a subsequent transaction, the main control section 201 dispenses the slip, and the flow returns to the transaction item selection step (step 387 in FIG. 15-5). The card is not returned to the customer, and the subsequent transaction is accepted.

If the customer does not wish to continue a subsequent transaction to the balance inquiry and passbook print request, the main control section 201 dispenses first the slip and then the passbook or card. Thus, the transaction is completed. The above operation is performed in steps 615 through 645 in FIGS. 15—15 and 15-16.

When the customer depresses a key of the keyboard 6 which corresponds to a cheque inquiry, a receipt inquiry a passbook inquiry at the time of item selection, the main control section 201 communicates with the host computer 223 (step 647). The host computer 223 stores the corresponding data in a memory area of the transaction data file 224 which corresponds to the account. The main control section 201 then checks if the transaction is accepted (step 649). If YES in step 649, the main control section 201 checks the status signal of the message (step 651). When the main control section 201 determines that a passbook request is allowed, the main control section 201 causes the CRT display 7 to display the guide message "Passbook REQ. OK. Remove Slip" in step 653. When the customer removes the slip in accordance with the above guide message (step 659), the main control section 201 is operated to dispense the card or passbook (steps 661 through 669). A checkbook request and a statement request can be performed in the same manner as the passbook request.

The passbook request is made by the customer to the bank when only no blank page of the passbook remains, so as to request the issue of a new passbook having the same account number. This request data is stored in the host computer 223 and thereafter the bank mails a new passbook to the corresponding customer. In this case, the use of the current passbook is checked by the host computer 223. The passbook request can only be accepted when the host computer confirms that the last page is being used. Since this type of transaction can be performed by the automatic teller machine, teller operations for passbook issuance can be greatly decreased.

Furthermore, a checkbook request or a statement request can be processed in the same manner as the passbook request. These request data are stored by the host computer 223 in predetermined memory areas in the transaction data file 224. Bank personnel subsequently mail statements or checkbooks to the respective customers.

What is claimed is:

1. An automatic teller system comprising:

an automatic teller machine having means to read out a key number recorded on a recording medium, for automatically performing transactions such as a deposit and a payment;

an electronic data processing center, connected to said automatic teller machine and having a memory for storing a plurality of accounting numbers associated with said key number, for reading out said plurality of accounting numbers from said memory upon receipt of said key number;

first transmitting means, provided at the automatic teller machine side, for transmitting said key number to said electronic data processing center;

second transmitting means, provided at the electronic data processing center side, for transmitting said plurality of accounting numbers, associated with said key number, to said automatic teller machine;

displaying means for displaying said plurality of accounting numbers; and selecting means for selecting a desired accounting number from said plurality of accounting numbers.

2. A system according to claim 1, wherein said automatic teller machine has a passbook printer unit for printing transaction contents on a passbook inserted in said automatic teller machine, and said passbook printer unit prints on the passbook nonprinted transaction data transmitted from said electronic data processing center excluding current transaction data indicating a deposit amount when the customer makes the deposit using an envelope.

3. A system according to claim 1, wherein the transaction items include a new passbook issuance request, there is further provided keyboard means for selecting the new passbook issuance request among the transaction items, and in that, when the customer makes the new passbook issuance request at said keyboard means, said automatic teller machine transmits new passbook issuance request data to said electronic data processing center, and said electronic data processing center stores, in response to transmitted new passbook request data, the new passbook issuance request data in said memory so as to correspond to the account number.

4. A system according to claim 1 wherein said automatic teller machine includes:

determining means for determining whether or not a transaction medium having a predetermined account number recorded thereon is inserted;

memory means for storing a predetermined transaction amount data corresponding to the predetermined account number; and means for reading out the predetermined transaction amount data in accordance with a determination result from said determining means and for displaying predetermined transaction amount data read from said memory means.

5. A system according to claim 1, wherein:

said displaying means comprises a display unit for selectively displaying at said automatic teller machine an account number of said at least one account number which excludes a first account number and which is transmitted from said electronic data processing center, the transaction items including a bank transfer, and the first account number being an account number which is displayed at said displaying means and which is selected by the customer at the time of the bank transfer; and said system further comprises means for setting as a second account number a further account number which is selected by the customer at said displaying means, whereby the bank transfer is made between the first and second account numbers.

6. A system according to claim 5, wherein the bank transfer is performed along one of routes from the first account number to the second account number and from the second account number to the first account number, in accordance with a type of the first account number.

* * * * *